(12) United States Patent
Gordon

(10) Patent No.: US 7,333,113 B2
(45) Date of Patent: Feb. 19, 2008

(54) MOBILE MOTION CAPTURE CAMERAS

(75) Inventor: Demian Gordon, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 11/372,330

(22) Filed: Mar. 8, 2006

(65) Prior Publication Data

US 2006/0152512 A1  Jul. 13, 2006

Related U.S. Application Data

(63) Continuation-in-part of application No. 11/004,320, filed on Dec. 3, 2004, which is a continuation-in-part of application No. 10/427,114, filed on May 1, 2003, now Pat. No. 7,218,320.

(60) Provisional application No. 60/454,872, filed on Mar. 13, 2003, provisional application No. 60/696,193, filed on Jul. 1, 2005.

(51) Int. Cl.
*G06T 15/70* (2006.01)

(52) U.S. Cl. ............... 345/475; 345/419; 348/475; 382/103

(58) Field of Classification Search ......... 345/419, 345/475; 348/475; 382/103
See application file for complete search history.

(56) References Cited

U.S. PATENT DOCUMENTS

| | | | |
|---|---|---|---|
| 5,774,591 A | 6/1998 | Black et al. | |
| 5,802,220 A | 9/1998 | Black et al. | |
| 6,020,892 A | 2/2000 | Dillon | |
| 6,272,231 B1 | 8/2001 | Maurer et al. | |
| 6,324,296 B1 | 11/2001 | McSheery et al. | |
| 6,707,444 B1 | 3/2004 | Hendriks et al. | |
| 6,774,869 B2 | 8/2004 | Biocca et al. | |
| 6,788,333 B1 * | 9/2004 | Uyttendaele et al. | 348/36 |
| 6,950,104 B1 | 9/2005 | Marschner et al. | |
| 7,012,637 B1 * | 3/2006 | Blume et al. | 348/218.1 |

* cited by examiner

*Primary Examiner*—Kimbinh T. Nguyen
(74) *Attorney, Agent, or Firm*—Samuel S. Lee; Procopio, Cory, Hargreaves & Savitch LLP

(57) ABSTRACT

A system for capturing motion comprises: a motion capture volume configured to include at least one moving object having markers defining a plurality of points on the at least one moving object; at least one mobile motion capture camera, the at least one mobile motion capture camera configured to be moveable within the motion capture volume; and a motion capture processor coupled to the at least one mobile motion capture camera to produce a digital representation of movement of the at least one moving object.

31 Claims, 19 Drawing Sheets

MOBILE MOTION CAPTURE CAMERAS

CROSS-REFERENCE TO RELATED APPLICATIONS

This application claims priority pursuant to 35 U.S.C. §120 as a continuation-in-part of U.S. patent application Ser. No. 11/004,320, filed Dec. 3, 2004, entitled "System and Method for Capturing Facial and Body Motion", which is a continuation-in-part of U.S. patent application Ser. No. 10/427,114, filed May 1, 2003 now U.S. Pat. No. 7,218,320, entitled "System and Method for Capturing Facial and Body Motion", which claims the benefit of U.S. Provisional Patent Application Ser. No. 60/454,872 filed Mar. 13, 2003. This application also claims the benefit of priority of co-pending U.S. Provisional Patent Application Ser. No. 60/696,193, filed Jul. 1, 2005, entitled "Mobile Motion Capture Cameras."

Benefits of priority of these applications, including the filing dates of Mar. 13, 2003, May 1, 2003, Dec. 3, 2004, and Jul. 1, 2005, are hereby claimed, and the disclosures of the above-referenced patent applications are hereby incorporated by reference.

BACKGROUND

The present invention relates to three-dimensional graphics and animation, and more particularly, to a motion capture system that enables both facial and body motion to be captured simultaneously within a volume that can accommodate plural actors.

Motion capture systems are used to capture the movement of a real object and map it onto a computer generated object. Such systems are often used in the production of motion pictures and video games for creating a digital representation of a person that is used as source data to create a computer graphics (CG) animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce incredibly realistic animations in many popular movies.

Motion capture systems are also used to track the motion of facial features of an actor to create a representation of the actor's facial motion and expression (e.g., laughing, crying, smiling, etc.). As with body motion capture, markers are attached to the actor's face and cameras record the actor's expressions. Since facial movement involves relatively small muscles in comparison to the larger muscles involved in body movement, the facial markers are typically much smaller than the corresponding body markers, and the cameras typically have higher resolution than cameras usually used for body motion capture. The cameras are typically aligned in a common plane with physical movement of the actor restricted to keep the cameras focused on the actor's face. The facial motion capture system may be incorporated into a helmet or other implement that is physically attached to the actor so as to uniformly illuminate the facial markers and minimize the degree of relative movement between the camera and face. For this reason, facial motion and body motion are usually captured in separate steps. The captured facial motion data is then combined with captured body motion data later as part of the subsequent animation process.

An advantage of motion capture systems over traditional animation techniques, such as keyframing, is the capability of real-time visualization. The production team can review the spatial representation of the actor's motion in real-time or near real-time, enabling the actor to alter the physical performance in order to capture optimal data. Moreover, motion capture systems detect subtle nuances of physical movement that cannot be easily reproduced using other animation techniques, thereby yielding data that more accurately reflects natural movement. As a result, animation created using source material that was collected using a motion capture system will exhibit a more lifelike appearance.

Notwithstanding these advantages of motion capture systems, the separate capture of facial and body motion often results in animation data that is not truly lifelike. Facial motion and body motion are inextricably linked, such that a facial expression is often enhanced by corresponding body motion. For example, an actor may utilize certain body motion (i.e., body language) to communicate motions and emphasize corresponding facial expressions, such as using arm flapping when talking excitedly or shoulder shrugging when frowning. This linkage between facial motion and body motion is lost when the motions are captured separately, and it is difficult to synchronize these separately captured motions together. When the facial motion and body motion are combined, the resulting animation will often appear noticeably abnormal. Since it is an objective of motion capture to enable the creation of increasingly realistic animation, the decoupling of facial and body motion represents a significant deficiency of conventional motion capture systems.

Another drawback of conventional motion capture systems is that motion data of an actor may be occluded by interference with other objects, such as props or other actors. Specifically, if a portion of the body or facial markers is blocked from the field of view of the digital cameras, then data concerning that body or facial portion is not collected. This results in an occlusion or hole in the motion data. While the occlusion can be filled in later during post-production using conventional computer graphics techniques, the fill data lacks the quality of the actual motion data, resulting in a defect of the animation that may be discernable to the viewing audience. To avoid this problem, conventional motion capture systems limit the number of objects that can be captured at one time, e.g., to a single actor. This also tends to make the motion data appear less realistic, since the quality of an actor's performance often depends upon interaction with other actors and objects. Moreover, it is difficult to combine these separate performances together in a manner that appears natural.

Yet another drawback of conventional motion capture systems is that audio is not recorded simultaneously with the motion capture. In animation, it is common to record the audio track first, and then animate the character to match the audio track. During facial motion capture, the actor will lip synch to the recorded audio track. This inevitably results in a further reduction of the visual quality of the motion data, since it is difficult for an actor to perfectly synchronize facial motion to the audio track. Also, body motion often affects the way in which speech is delivered, and the separate capture of body and facial motion increases the difficulty of synchronizing the audio track to produce a cohesive end product.

Accordingly, it would be desirable to provide a motion capture system that overcomes these and other drawbacks of the prior art. More specifically, it would be desirable to provide a motion capture system that enables both body and facial motion to be captured simultaneously within a volume that can accommodate plural actors. It would also be desirable to provide a motion capture system that enables audio recording simultaneously with body and facial motion capture.

SUMMARY

The present invention provides systems and methods for capturing motion using mobile motion capture cameras.

In one implementation, a system for capturing motion comprises: a motion capture volume configured to include at least one moving object having markers defining a plurality of points on the at least one moving object; at least one mobile motion capture camera, the at least one mobile motion capture camera configured to be moveable within the motion capture volume; and a motion capture processor coupled to the at least one mobile motion capture camera to produce a digital representation of movement of the at least one moving object.

In another implementation, another system for capturing motion comprises: at least one mobile motion capture camera configured to be moveable, the at least one mobile motion capture camera operating to capture motion within a motion capture volume; and at least one mobile motion capture rig configured to enable the at least one mobile motion capture camera to be disposed on the at least one mobile motion capture rig such that cameras of the at least one mobile motion capture camera can be moved.

In another implementation, a method for capturing motion comprises: defining a motion capture volume configured to include at least one moving object having markers defining a plurality of points on the at least one moving object; moving at least one mobile motion capture camera within the motion capture volume; and processing data from the at least one mobile motion capture camera to produce a digital representation of movement of the at least one moving object.

In yet another implementation, a system for capturing motion comprises: means for defining a motion capture volume configured to include at least one moving object having markers defining a plurality of points on the at least one moving object; means for moving at least one mobile motion capture camera within the motion capture volume; and means for processing data from the at least one mobile motion capture camera to produce a digital representation of movement of the at least one moving object.

DETAILED DESCRIPTION

As will be further described below, the present invention satisfies the need for a motion capture system that enables both body and facial motion to be captured simultaneously within a volume that can accommodate plural actors. Further, the present invention also satisfies the need for a motion capture system that enables audio recording simultaneously with body and facial motion capture. In the detailed description that follows, like element numerals are used to describe like elements illustrated in one or more of the drawings.

Figure 1:
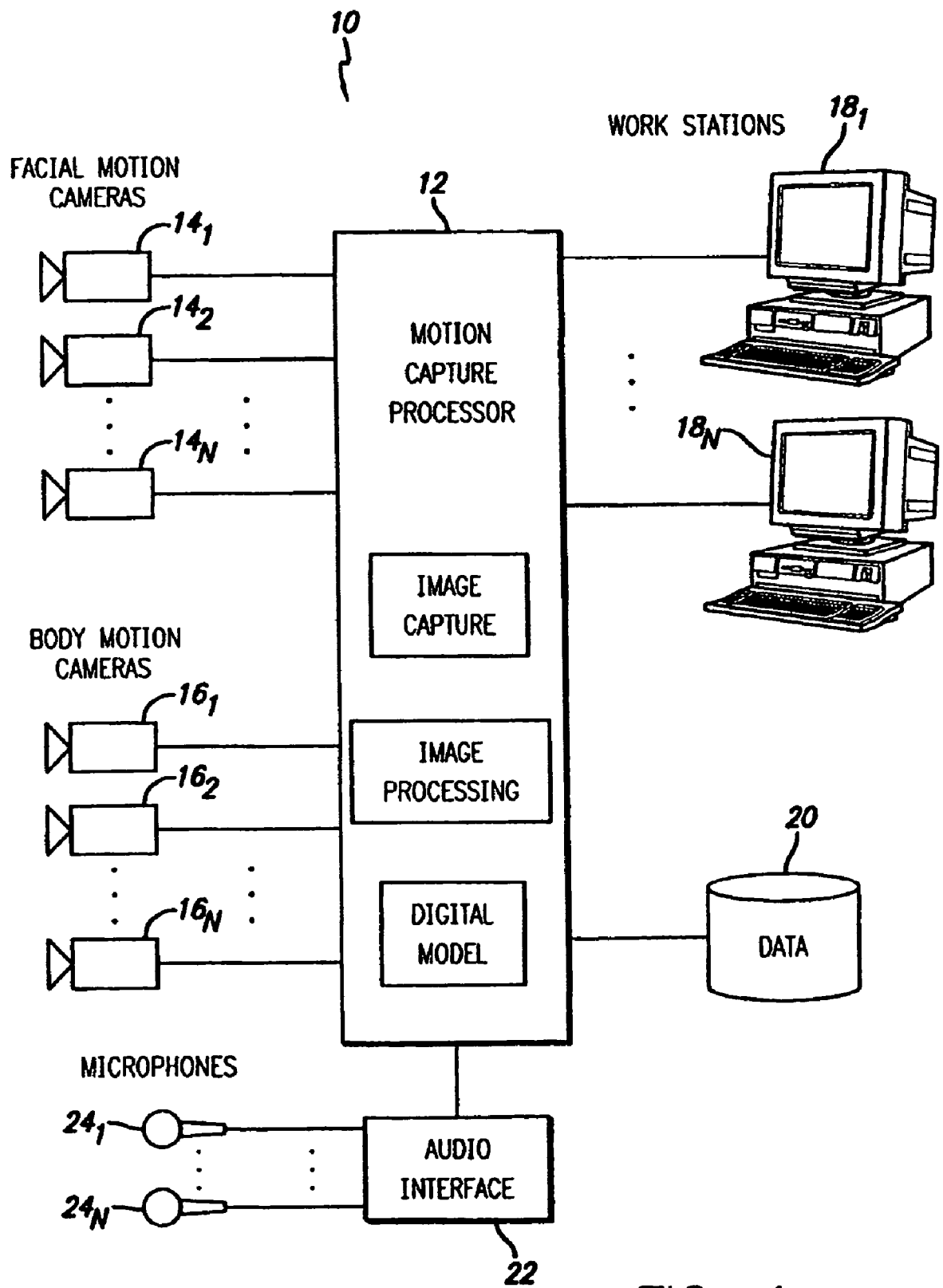
FIG. 1 is a block diagram illustrating a motion capture system in accordance with an embodiment of the present invention.

Referring first to FIG. 1, a block diagram illustrates a motion capture system 10 in accordance with an embodiment of the present invention. The motion capture system 10 includes a motion capture processor 12 adapted to communicate with a plurality of facial motion cameras $14_1$-$14_N$ and a plurality of body motion cameras 161-16N. The motion capture processor 12 may further comprise a programmable computer having a data storage device 20 adapted to enable the storage of associated data files. One or more computer workstations $18_1$-$18_N$ may be coupled to the motion capture processor 12 using a network to enable multiple graphic artists to work with the stored data files in the process of creating a computer graphics animation. The facial motion cameras $14_1$-$14_N$ and body motion cameras $16_1$-$16_N$ are arranged with respect to a motion capture volume (described below) to capture the combined motion of one or more actors performing within the motion capture volume.

Each actor's face and body is marked with markers that are detected by the facial motion cameras $14_1$-$14_N$ and body motion cameras $16_1$-$16_N$ during the actor's performance within the motion capture volume. The markers may be reflective or illuminated elements. Specifically, each actor's body may be marked with a plurality of reflective markers disposed at various body locations including head, legs, arms, and torso. The actor may be wearing a body suit formed of non-reflective material to which the markers are attached. The actor's face will also be marked with a plurality of markers. The facial markers are generally smaller than the body markers and a larger number of facial markers are used than body markers. To capture facial motion with sufficient resolution, it is anticipated that a high number of facial markers be utilized (e.g., more than 100). In one implementation, 152 small facial markers and 64 larger body markers are affixed to the actor. The body markers may have a width or diameter in the range of 5 to 9 millimeters, while the face markers may have a width or diameter in the range of 2 to 4 millimeters.

To ensure consistency of the placement of the face markers, a mask may be formed of each actor's face with holes drilled at appropriate locations corresponding to the desired marker locations. The mask may be placed over the actor's face, and the hole locations marked directly on the face using a suitable pen. The facial markers can then be applied to the actor's face at the marked locations. The facial markers may be affixed to the actor's face using suitable materials known in the theatrical field, such as make-up glue. This way, a motion capture production that extends over a lengthy period of time (e.g., months) can obtain reasonably consistent motion data for an actor even though the markers are applied and removed each day.

The motion capture processor 12 processes two-dimensional images received from the facial motion cameras $14_1$-$14_N$ and body motion cameras $16_1$-$16_N$ to produce a three-dimensional digital representation of the captured motion. Particularly, the motion capture processor 12 receives the two-dimensional data from each camera and saves the data in the form of multiple data files into data storage device 20 as part of an image capture process. The two-dimensional data files are then resolved into a single set of three-dimensional coordinates that are linked together in the form of trajectory files representing movement of individual markers as part of an image processing process. The image processing process uses images from one or more cameras to determine the location of each marker. For example, a marker may only be visible to a subset of the cameras due to occlusion by facial features or body parts of actors within the motion capture volume. In that case, the image processing uses the images from other cameras that have an unobstructed view of that marker to determine the marker's location in space.

By using images from multiple cameras to determine the location of a marker, the image processing process evaluates the image information from multiple angles and uses a triangulation process to determine the spatial location. Kinetic calculations are then performed on the trajectory files to generate the digital representation reflecting body and facial motion corresponding to the actors' performance. Using the spatial information over time, the calculations determine the progress of each marker as it moves through space. A suitable data management process may be used to control the storage and retrieval of the large number files associated with the entire process to/from the data storage device 20. The motion capture processor 12 and workstations $18_1$-$18_N$ may utilize commercial software packages to perform these and other data processing functions, such as available from Vicon Motion Systems or Motion Analysis Corp.

The motion capture system 10 further includes the capability to record audio in addition to motion. A plurality of microphones $24_1$-$24_N$ may be arranged around the motion capture volume to pick up audio (e.g., spoken dialog) during the actors' performance. The motion capture processor 12 may be coupled to the microphones $24_1$-$24_N$, either directly or through an audio interface 22. The microphones $24_1$-$24_N$ may be fixed in place, or may be moveable on booms to follow the motion, or may be carried by the actors and communicate wirelessly with the motion capture processor 12 or audio interface 22. The motion capture processor 12 would receive and store the recorded audio in the form of digital files on the data storage device 20 with a time track or other data that enables synchronization with the motion data.

Figure 2:
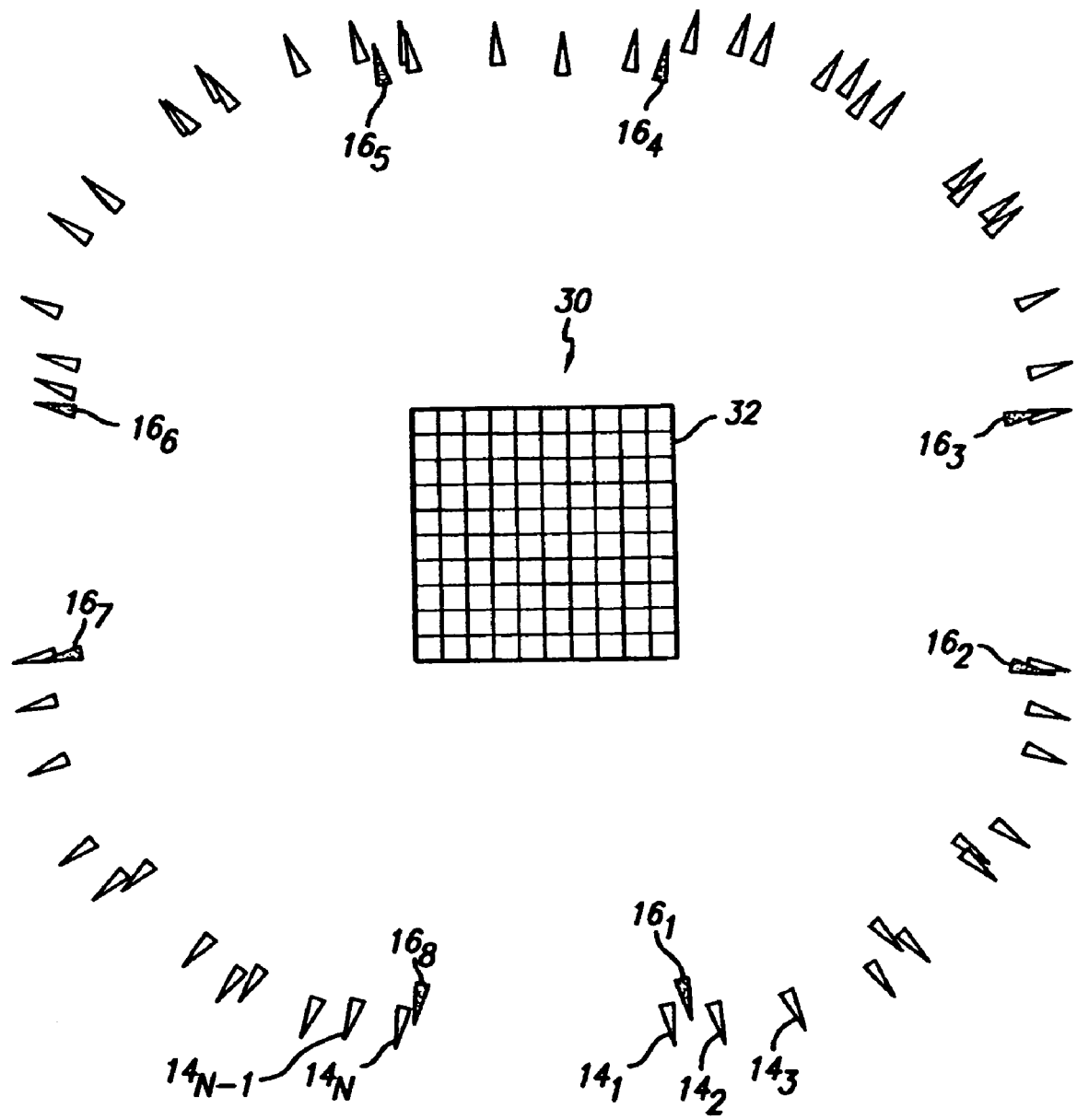
FIG. 2 is a top view of a motion capture volume with a plurality of motion capture cameras arranged around the periphery of the motion capture volume.
Figure 3:
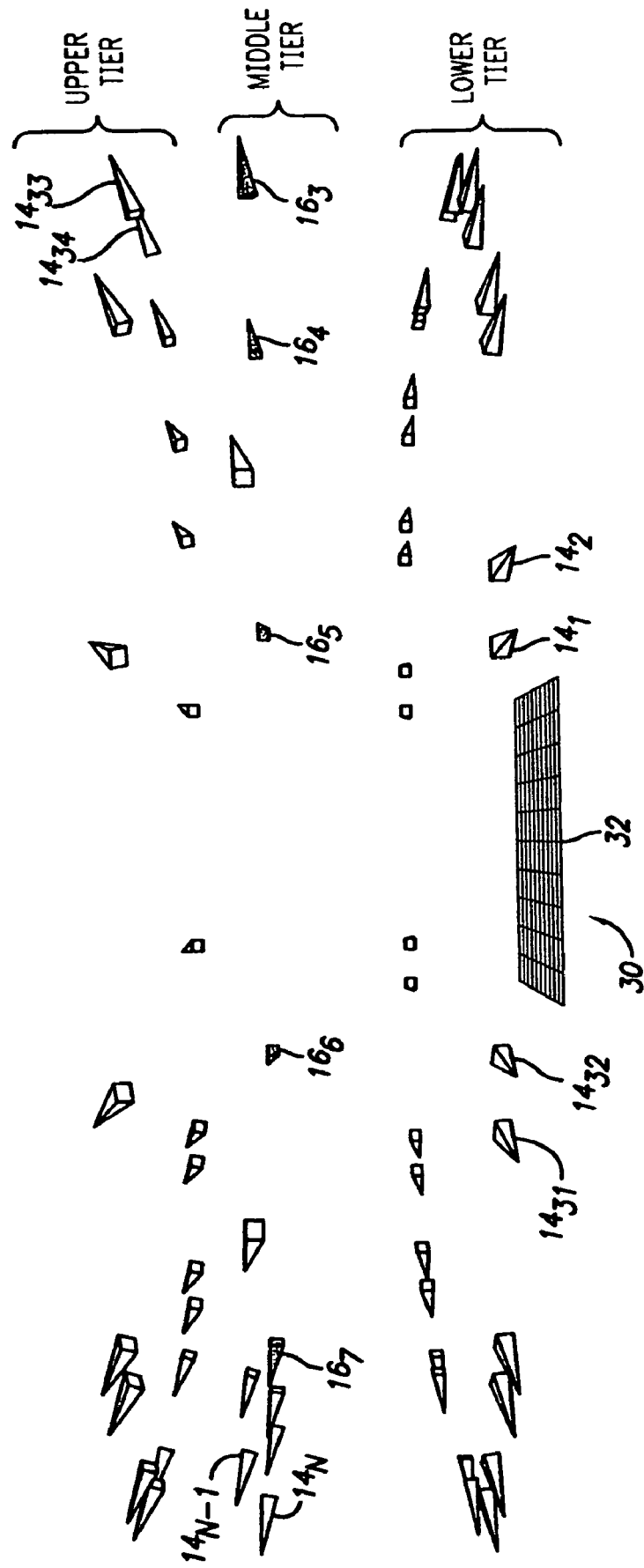
FIG. 3 is a side view of the motion capture volume with a plurality of motion capture cameras arranged around the periphery of the motion capture volume.

FIGS. 2 and 3 illustrate a motion capture volume 30 surrounded by a plurality of motion capture cameras. The motion capture volume 30 includes a peripheral edge 32. The motion capture volume 30 is illustrated as a rectangular-shaped region subdivided by grid lines. It should be appreciated that the motion capture volume 30 actually comprises a three-dimensional space with the grid defining a floor for the motion capture volume. Motion would be captured within the three dimensional space above the floor. In one implementation of the invention, the motion capture volume 30 comprises a floor area of approximately 10 feet by 10 feet, with a height of approximately 6 feet above the floor. Other size and shape motion capture volumes can also be advantageously utilized to suit the particular needs of a production, such as oval, round, rectangular, polygonal, etc.

FIG. 2 illustrates a top view of the motion capture volume 30 with the plurality of motion capture cameras arranged around the peripheral edge 32 in a generally circular pattern. Individual cameras are represented graphically as triangles with the acute angle representing the direction of the lens of the camera, so it should be appreciated that the plurality of cameras are directed toward the motion capture volume 30 from a plurality of distinct directions. More particularly, the plurality of motion capture cameras further include a plurality of body motion cameras $16_1$-$16_8$ and a plurality of facial motion cameras $14_1$-$14_N$. In view of the high number of facial motion cameras in FIG. 2, it should be appreciated that many are not labeled. In the present embodiment of the invention, there are many more facial motion cameras than body motion cameras. The body motion cameras $16_1$-$16_8$ are arranged roughly two per side of the motion capture volume 30, and the facial motion cameras $14_1$-$14_N$ are arranged roughly twelve per side of the motion capture volume 30. The facial motion cameras $14_1$-$14_N$ and the body motion cameras $16_1$-$16_N$ are substantially the same except that the focusing lenses of the facial motion cameras are selected to provide narrower field of view than that of the body motion cameras.

FIG. 3 illustrates a side view of the motion capture volume 30 with the plurality of motion capture cameras arranged into roughly three tiers above the floor of the motion capture volume. A lower tier includes a plurality of facial motion cameras $14_1$-$14_{32}$, arranged roughly eight per side of the motion capture volume 30. In an embodiment of the invention, each of the lower tier facial motion cameras $14_1$-$14_{32}$ are aimed slightly upward so as to not include a camera roughly opposite the motion capture volume 30 from being included within the field of view. The motion capture cameras generally include a light source (e.g., an array of light emitting diodes) used to illuminate the motion capture volume 30. It is desirable to not have a motion capture camera "see" the light source of another motion capture camera, since the light source will appear to the motion capture camera as a bright reflectance that will overwhelm data from the reflective markers. A middle tier includes a plurality of body motion cameras $16_3$-$16_7$ arranged roughly two per side of the motion capture volume 30. As discussed above, the body motion cameras have a wider field of view than the facial motion cameras, enabling each camera to include a greater amount of the motion capture volume 30 within its respective field of view.

The upper tier includes a plurality of facial motion cameras (e.g., $14_{33}$-$14_{52}$), arranged roughly five per side of the motion capture volume 30. In an embodiment of the invention, each of the upper tier facial motion cameras $14_{33}$-$14_{52}$ are aimed slightly downward so as to not include a camera roughly opposite the motion capture volume 30 from being included within the field of view. Shown on the left-hand side of FIG. 2, a number of facial motion cameras (e.g., $14_{53}$-$14_{60}$) are also included in the middle tier focused on the front edge of the motion capture volume 30. Since the actors' performance will be generally facing the front edge of the motion capture volume 30, the number of cameras in that region are increased to reduce the amount of data lost to occlusion. In addition a number of facial motion cameras (e.g., $14_{61}$-$14_{64}$) are included in the middle tier focused on the corners of the motion capture volume 30. These cameras also serve to reduce the amount of data lost to occlusion.

The body and facial motion cameras record images of the marked actors from many different angles so that substantially all of the lateral surfaces of the actors are exposed to at least one camera at all times. More specifically, it is preferred that the arrangement of cameras provide that substantially all of the lateral surfaces of the actors are exposed to at least three cameras at all times. By placing the cameras at multiple heights, irregular surfaces can be modeled as the actor moves within the motion capture field 30. The present motion capture system 10 thereby records the actors' body movement simultaneously with facial movement (i.e., expressions). As discussed above, audio recording can also be conducted simultaneously with motion capture.

Figure 4:
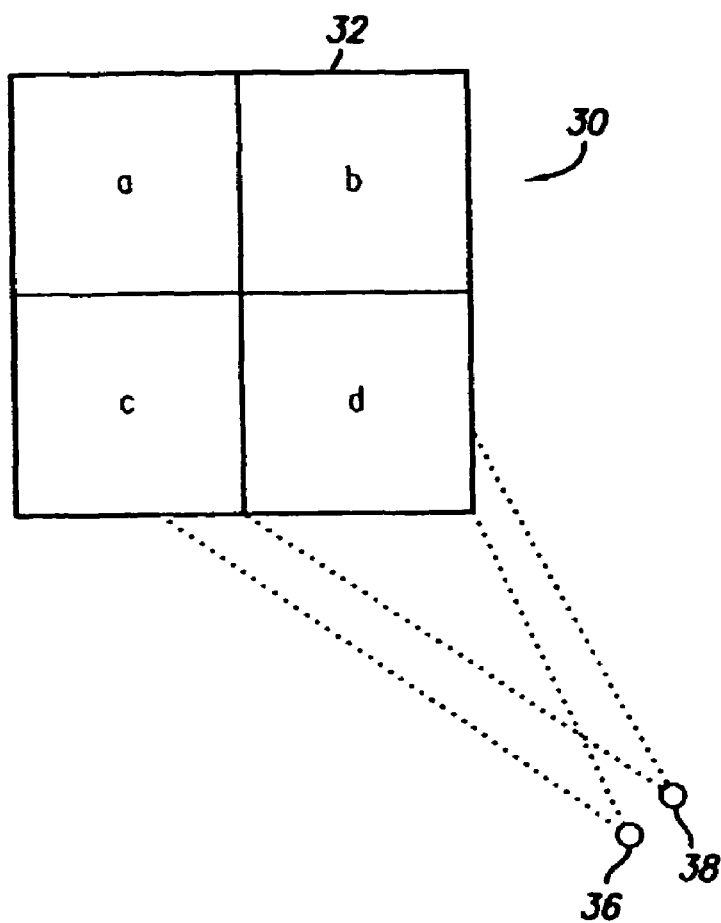
FIG. 4 is a top view of the motion capture volume illustrating an arrangement of facial motion cameras with respect to a quadrant of the motion capture volume.

FIG. 4 is a top view of the motion capture volume 30 illustrating an arrangement of facial motion cameras. The motion capture volume 30 is graphically divided into quadrants, labeled a, b, c and d. Facial motion cameras are grouped into clusters 36, 38, with each camera cluster representing a plurality of cameras. For example, one such camera cluster may include two facial motion cameras located in the lower tier and one facial motion camera located in the upper tier. Other arrangements of cameras within a cluster can also be advantageously utilized. The two camera clusters 36, 38 are physically disposed adjacent to each other, yet offset horizontally from each other by a discernable distance. The two camera clusters 36, 38 are each focused on the front edge of quadrant d from an angle of approximately 45°. The first camera cluster 36 has a field of view that extends from partially into the front edge of quadrant c to the right end of the front edge of quadrant d. The second camera cluster 38 has a field of view that extends from the left end of the front edge of quadrant d to partially into the right edge of quadrant d. Thus, the respective fields of view of the first and second camera clusters 36, 38 overlap over the substantial length of the front edge of quadrant d. A similar arrangement of camera clusters is included for each of the other outer edges (coincident with peripheral edge 32) of quadrants a, b, c and d.

Figure 5:
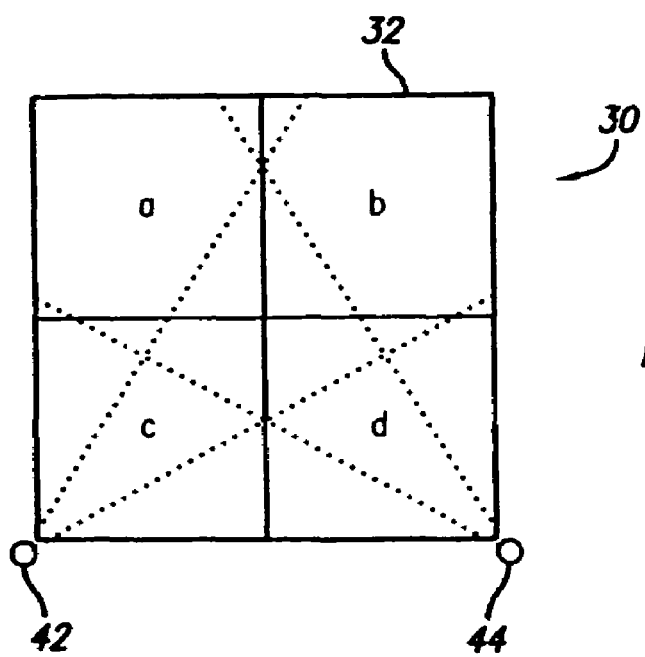
FIG. 5 is a top view of the motion capture volume illustrating another arrangement of facial motion cameras with respect to corners of the motion capture volume.

FIG. 5 is a top view of the motion capture volume 30 illustrating another arrangement of facial motion cameras. As in FIG. 4, the motion capture volume 30 is graphically divided into quadrants a, b, c and d. Facial motion cameras are grouped into clusters 42, 44, with each camera cluster representing a plurality of cameras. As in the embodiment of FIG. 4, the clusters may comprise one or more cameras located at various heights. In this arrangement, the camera clusters 42, 44 are located at corners of the motion capture volume 30 facing into the motion capture volume. These corner camera clusters 42, 44 would record images of the actors that are not picked up by the other cameras, such as due to occlusion. Other like camera clusters would also be located at the other corners of the motion capture volume 30.

Having a diversity of camera heights and angles with respect to the motion capture volume 30 serves to increase the available data captured from the actors in the motion capture volume and reduces the likelihood of data occlusion. It also permits a plurality of actors to be motion captured simultaneously within the motion capture volume 30. Moreover, the high number and diversity of the cameras enables the motion capture volume 30 to be substantially larger than that of the prior art, thereby enabling a greater range of motion within the motion capture volume and hence more complex performances. It should be appreciated that numerous alternative arrangements of the body and facial motion cameras can also be advantageously utilized. For example, a greater or lesser number of separate tiers can be utilized, and the actual height of each camera within an individual tier can be varied.

In the foregoing description of the motion capture cameras, the body and facial motion cameras remain fixed in place. This way, the motion capture processor 12 has a fixed reference point against which movement of the body and facial markers can be measured. A drawback of this arrangement is that it limits the size of the motion capture volume 30. If it was desired to capture the motion of a performance that requires a greater volume of space (e.g., a scene in which characters are running over a larger distance), the performance would have to be divided up into a plurality of segments that are motion captured separately.

In an alternative implementation, a number of the motion capture cameras remain fixed while others are moveable. In one configuration, the moveable motion capture cameras are moved to new position(s) and are fixed at the new position(s). In another configuration, the moveable motion capture cameras are moved to follow the action. Thus, in this configuration, the motion capture cameras perform motion capture while moving.

The moveable motion capture cameras can be moved using computer-controlled servomotors or can be moved manually by human camera operators. If the cameras are moved to follow the action (i.e., the camera perform motion capture while moving), the motion capture processor 12 would track the movement of the cameras, and remove this movement in the subsequent processing of the captured data to generate the three dimensional digital representation reflecting body and facial motion corresponding to the performances of actors. The moveable cameras can be moved individually or moved together by placing the cameras on a mobile motion capture rig. Thus, using mobile or movable cameras for motion capture provides improved flexibility in motion capture production.

Figure 13:
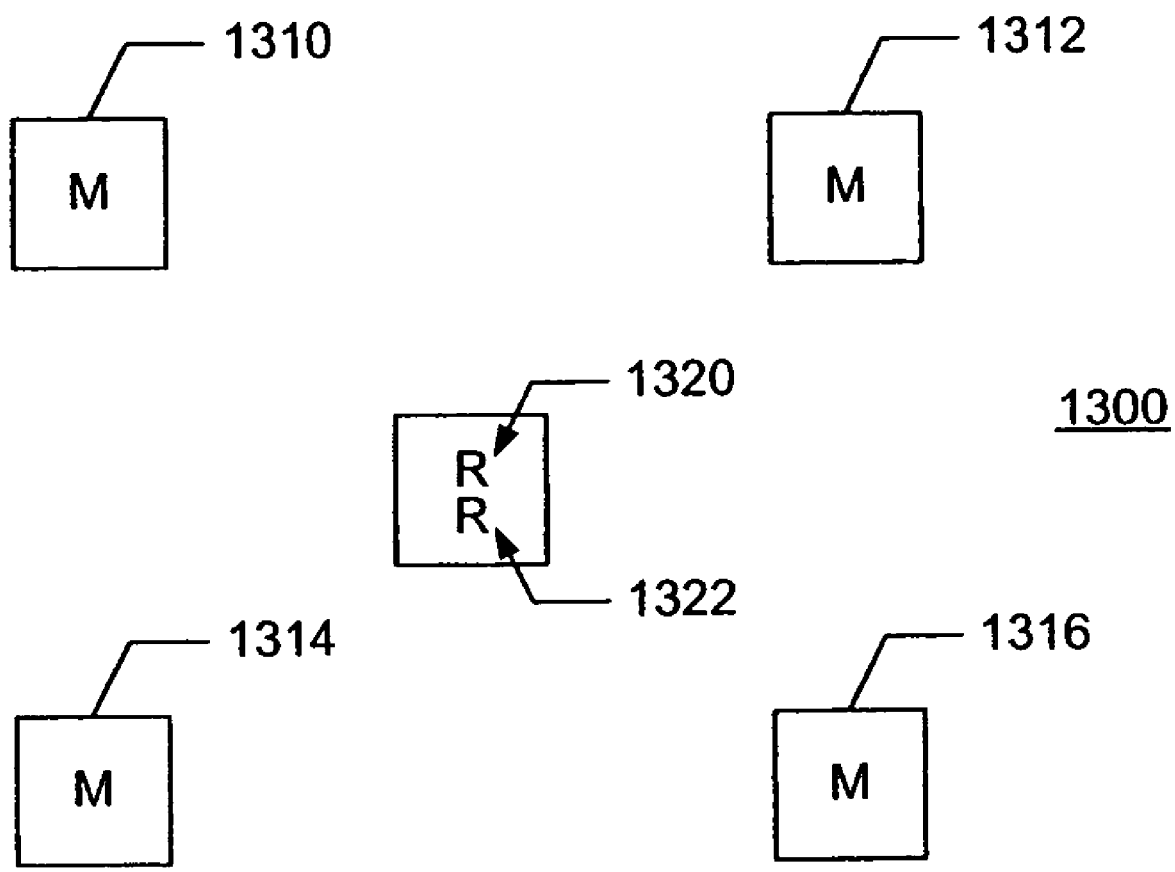
FIG. 13 shows a frontal view of one implementation of cameras positioned on a mobile motion capture rig.

In one implementation, illustrated in FIG. 13, a mobile motion capture rig 1300 includes six cameras 1310, 1312, 1314, 1316, 1320, 1322. FIG. 13 shows a frontal view of the cameras positioned on the mobile motion capture rig 1300. In the illustrated example of FIG. 13, four cameras 1310, 1312, 1314, 1316 are motion capture cameras. Two cameras 1320, 1322 are reference cameras. One reference camera 1320 is to show the view of the motion capture cameras 1310, 1312, 1314, 1316. The second reference camera 1322 is for video reference and adjustment. However, different camera configurations are also possible, with different numbers of motion capture cameras and reference cameras.

Although FIG. 13 shows the mobile motion capture rig 1300 having four motion capture cameras and two reference cameras, the rig 1300 can include only one or more motion capture cameras. For example, in one implementation, the mobile motion capture rig 1300 includes two motion capture cameras. In another implementation, the mobile motion capture rig 1300 includes one motion capture camera with a field splitter or a mirror to provide a stereo view.

Figure 14:
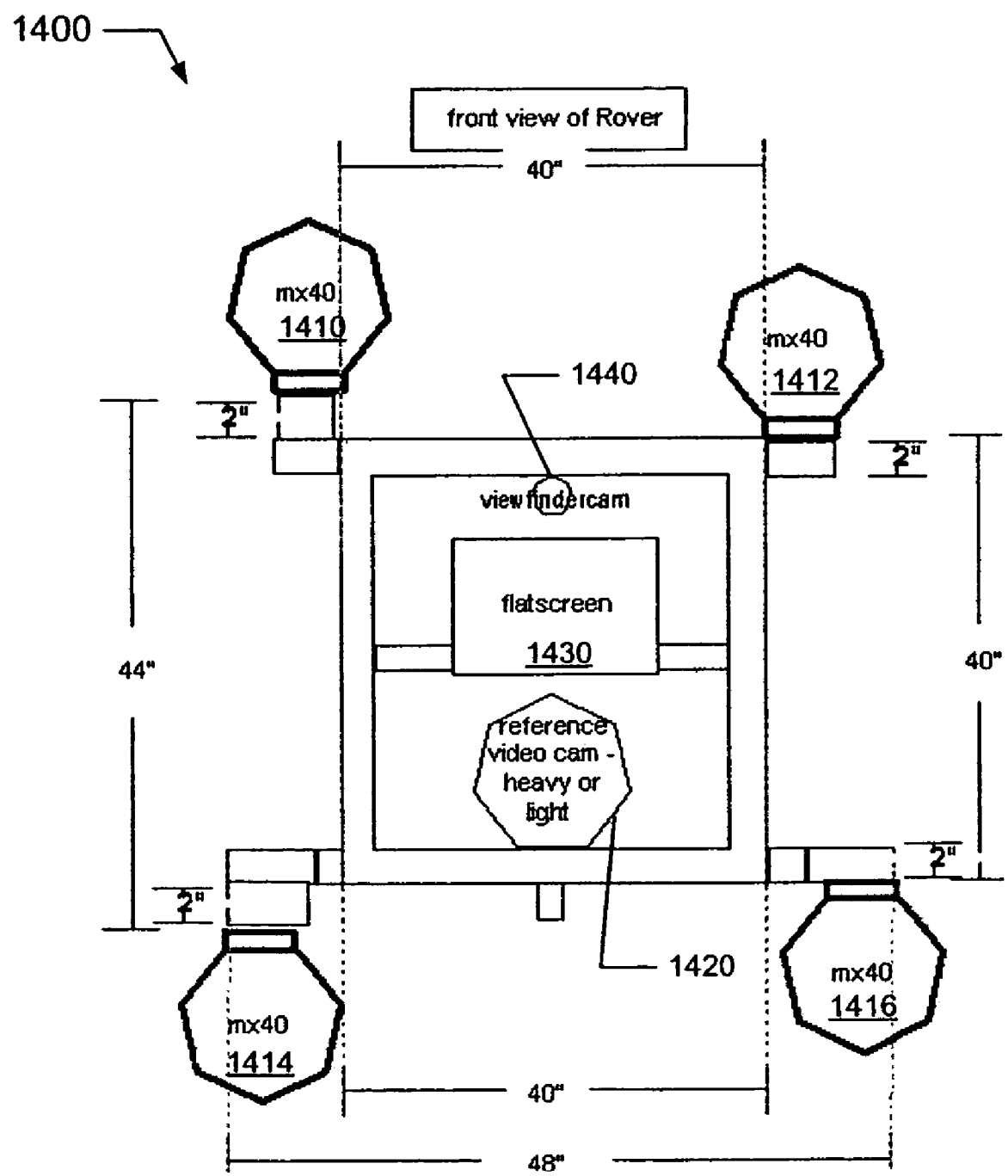
FIG. 14 illustrates a frontal view of a particular implementation of the mobile motion capture rig shown in FIG. 13.
Figure 15:
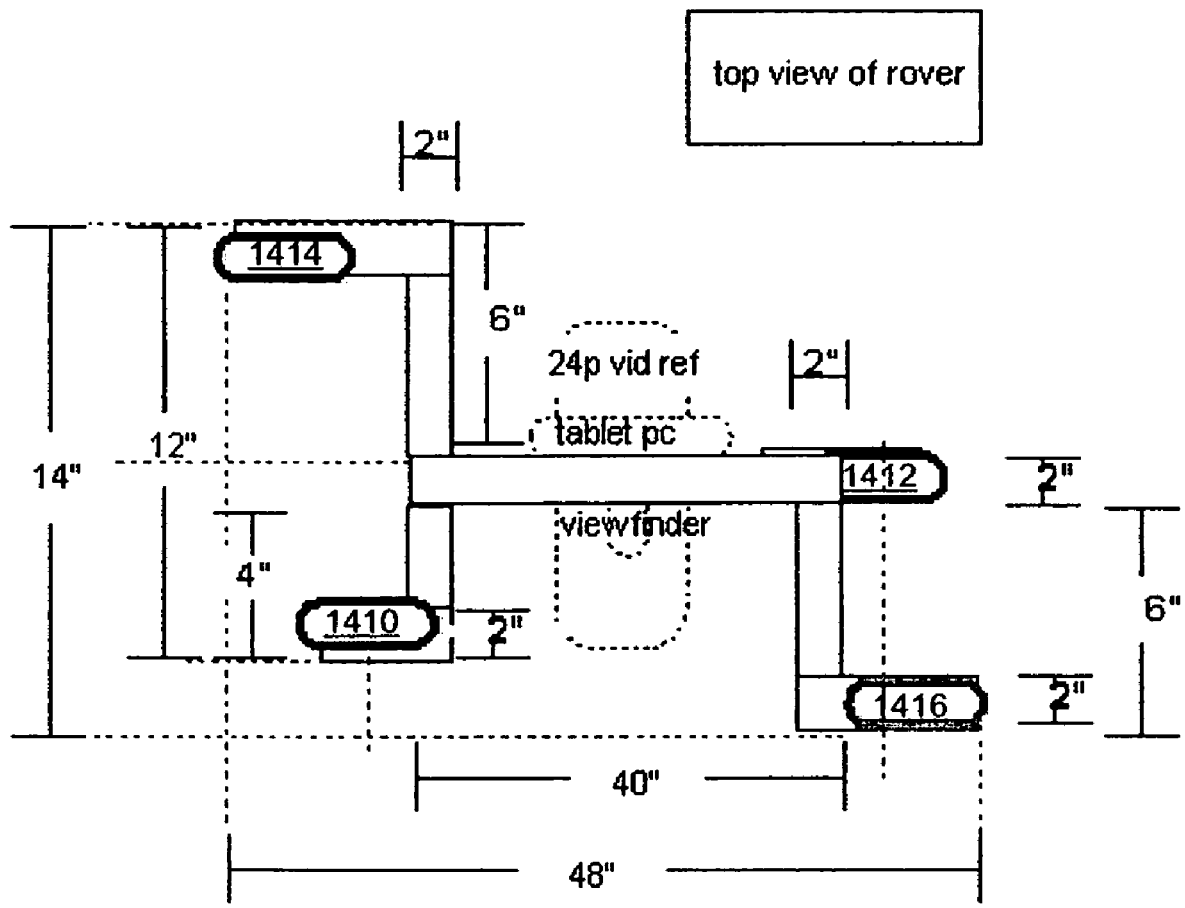
FIG. 15 illustrates a top view of a particular implementation of the mobile motion capture rig shown in FIG. 13.
Figure 16:
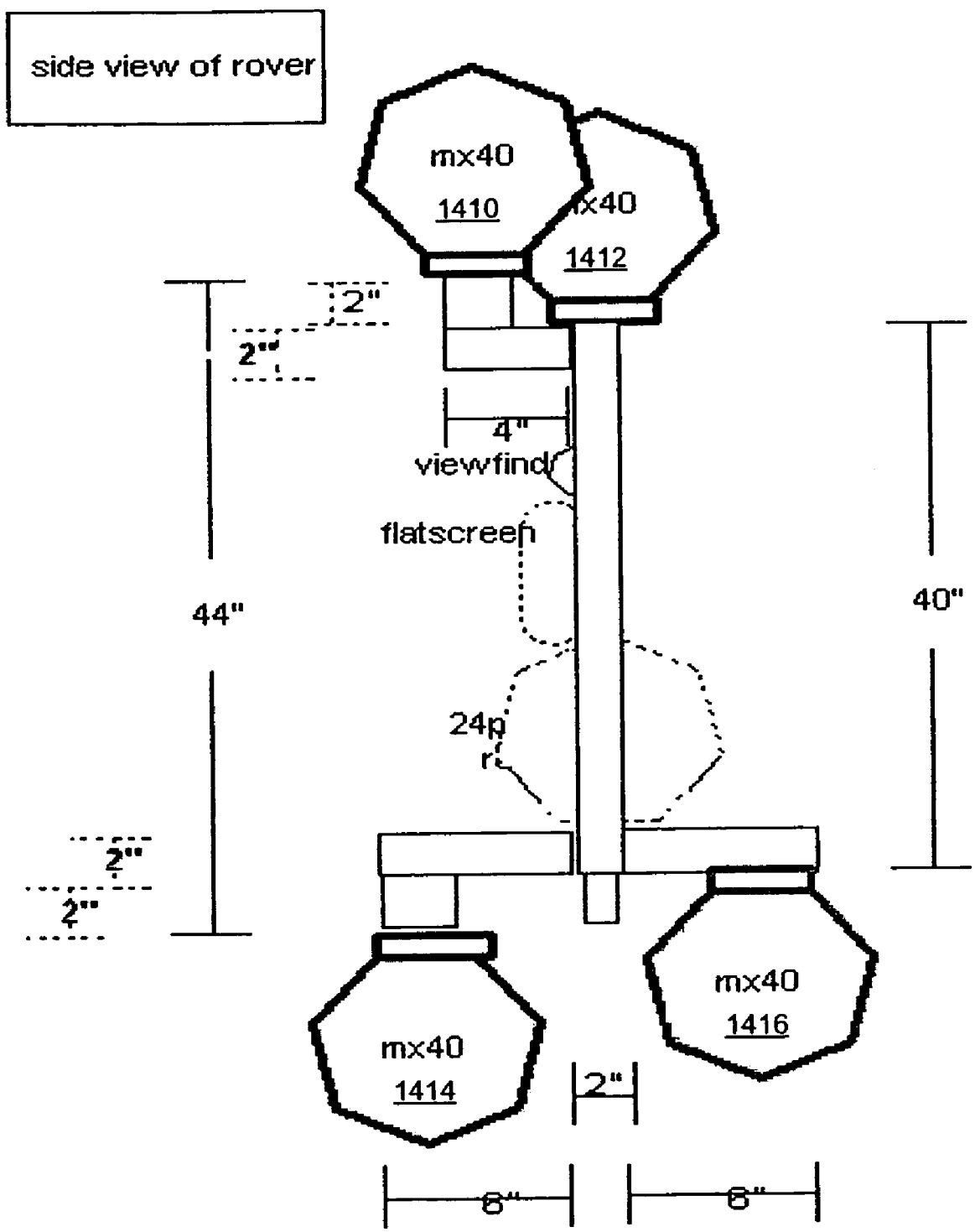
FIG. 16 illustrates a side view of a particular implementation of the mobile motion capture rig shown in FIG. 13.

FIG. 14, FIG. 15, and FIG. 16 illustrate front, top, and side views, respectively, of a particular implementation of the mobile motion capture rig shown in FIG. 13. The dimensions of the mobile motion capture rig are approximately 40"×40" in width and length, and approximately 14" in depth.

FIG. 14 shows a frontal view of the particular implementation of the mobile motion capture rig 1400. Four mobile motion capture cameras 1410, 1412, 1414, 1416 are disposed on the mobile motion capture rig 1400, and are positioned approximately 40 to 48 inches apart width and length-wise. Each mobile motion capture camera 1410, 1412, 1414, or 1416 is placed on a rotatable cylindrical base having approximately 2" outer diameter. The mobile motion capture rig 1400 also includes reference cameras 1420, computer and display 1430, and a view finder 1440 for framing and focus.

FIG. 15 shows a top view of the particular implementation of the mobile motion capture rig 1400. This view illustrates the offset layout of the four mobile motion capture cameras 1410, 1412, 1414, 1416. The top cameras 1410, 1412 are positioned at approximately 2 inches and 6 inches in depth, respectively, while the bottom cameras 1414, 1416 are positioned at approximately 14 inches and 1 inch in depth, respectively. Further, the top cameras 1410, 1412 are approximately 42 inches apart in width while the bottom cameras 1414, 1416 are approximately 46 inches apart in width.

FIG. 16 shows a side view of the particular implementation of the mobile motion capture rig 1400. This view highlights the different heights at which the four mobile motion capture cameras 1410, 1412, 1414, 1416 are positioned. For example, the top cameras 1410 is positioned at approximately 2 inches above the mobile motion capture camera 1412 while the bottom cameras 1414 is positioned at approximately 2 inches below the mobile motion capture camera 1416. In general, some of the motion capture cameras should be positioned low enough (e.g., approximately 2 feet off the ground) so that the cameras can capture performances at very low heights, such as kneeling down and/or looking down on the ground.

In another implementation, for example, a mobile motion capture rig includes a plurality of mobile motion capture cameras but no reference cameras. Thus, in this implementation, the feedback from the mobile motion capture cameras is used as reference information.

Further, various total numbers of cameras can be used in a motion capture setup, such as 200 or more cameras distributed among multiple rigs or divided among one or more movable rigs and fixed positions. For example, the setup may include 208 fixed motion capture cameras (32 performing real-time reconstruction of bodies) and 24 mobile motion capture cameras. In one example, the 24 mobile motion capture cameras are distributed into six motion capture rigs, each rig including four motion capture cameras. In other examples, the motion capture cameras are distributed into any number of motion capture rigs including no rigs such that the motion capture cameras are moved individually.

Figure 17:
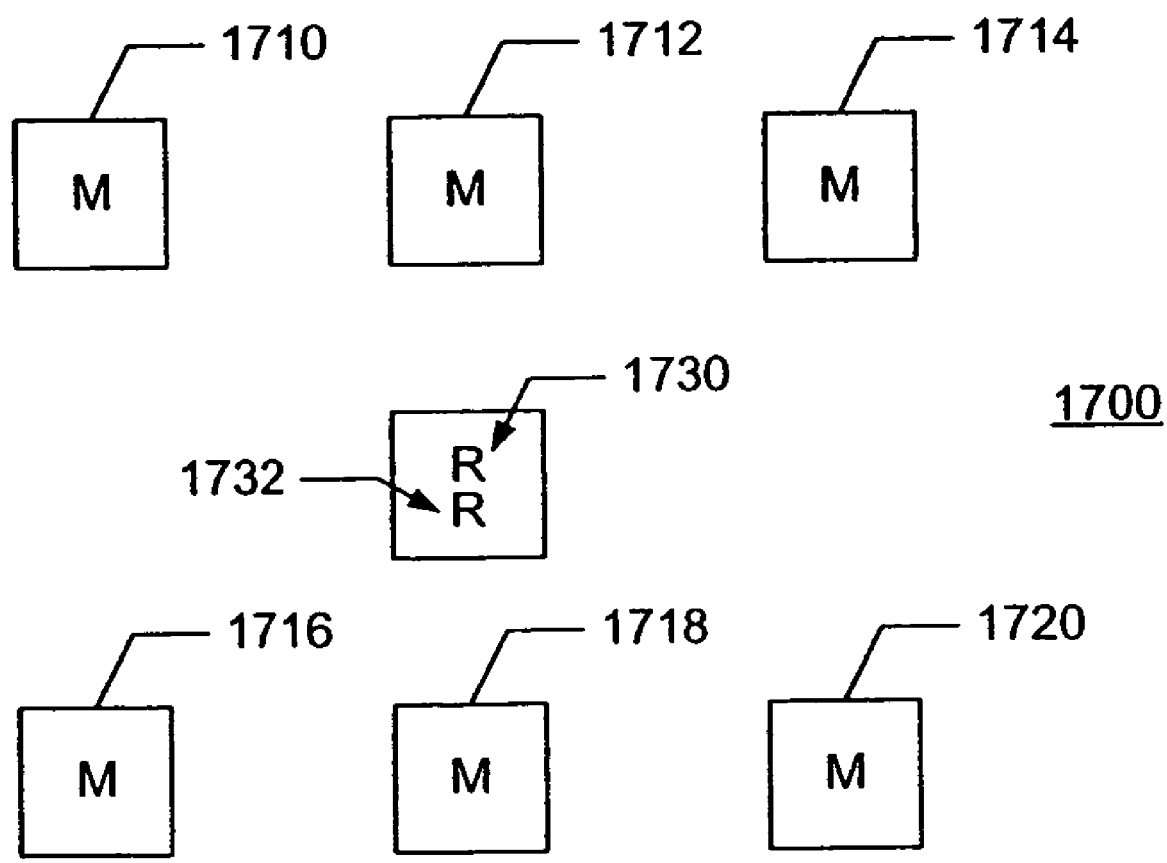
FIG. 17 shows a frontal view of another implementation of cameras positioned on a mobile motion capture rig.

In yet another implementation, illustrated in FIG. 17, a mobile motion capture rig 1700 includes six motion capture cameras 1710, 1712, 1714, 1716, 1718, 1720 and two reference cameras 1730, 1732. FIG. 17 shows a frontal view of the cameras positioned on the mobile motion capture rig 1700. Further, the motion capture rig 1700 can also include one or more displays to show the images captured by the reference cameras.

Figure 18:
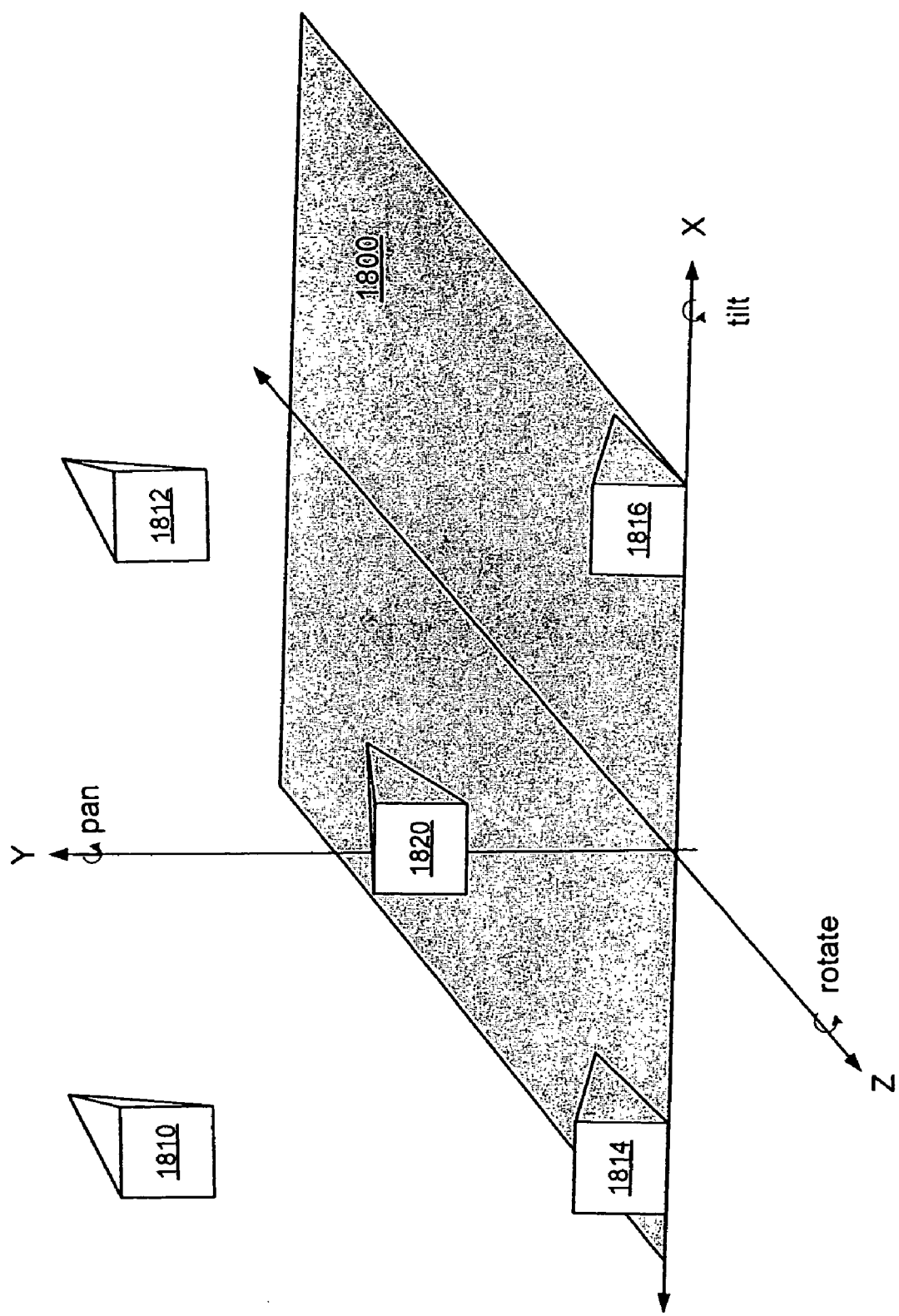
FIG. 18 shows a front perspective view of yet another implementation of cameras positioned on a mobile motion capture rig.

FIG. 18 illustrates a front perspective view of a mobile motion capture rig 1800 including cameras 1810, 1812, 1814, 1816, 1820. In the illustrated implemenation of FIG. 18, the mobile motion capture rig 1800 includes servomotors that provide at least 6 degrees of freedom (6-DOF) movements to the motion capture cameras 1810, 1812, 1814, 1816, 1820. Thus, the 6-DOF movements include three translation movements along the three axes X, Y, and Z, and three rotational movements about the three axes X, Y, and Z, namely tilt, pan, and rotate, respectively.

In one implementation, the motion capture rig 1800 provides the 6-DOF movements to all five cameras 1810, 1812, 1814, 1816, 1820. In another implementation, each of the cameras 1810, 1812, 1814, 1816, 1820 on the motion capture rig 1850 is restricted to some or all of the 6-DOF movements. For example, the upper cameras 1810, 1812 may be restricted to X and Z translation movements and pan and tilt down rotational movements; the lower cameras 1814, 1816 may be restricted to X and Z translation movements and pan and tilt up rotational movements; and the center camera 1820 may not be restricted so that it can move in all six directions (i.e., X, Y, Z translation movements and tilt, pan, and rotate rotational movements). In a further implementation, the motion capture rig 1800 moves, pans, tilts, and rotates during and/or between shots so that the cameras can be moved and positioned into a fixed position or moved to follow the action.

In one implementation, the motion of the motion capture rig 1800 is controlled by one or more people. The motion control can be manual, mechanical, or automatic. In another implementation, the motion capture rig moves according to a pre-programmed set of motions. In another implementation, the motion capture rig moves automatically based on received input, such as to track a moving actor based on RF, IR, sonic, or visual signals received by a rig motion control system.

In another implementation, the lighting for one or more fixed or mobile motion capture cameras is enhanced in brightness. For example, additional lights are placed with each camera. The increased brightness allows a reduced f-stop setting to be used and so can increase the depth of the volume for which the camera is capturing video for motion capture.

In another implementation, the mobile motion capture rig includes machine vision cameras using 24P video (i.e., 24 frames per second with progressive image storage) and 60 frames per second motion capture cameras.

Figure 19:
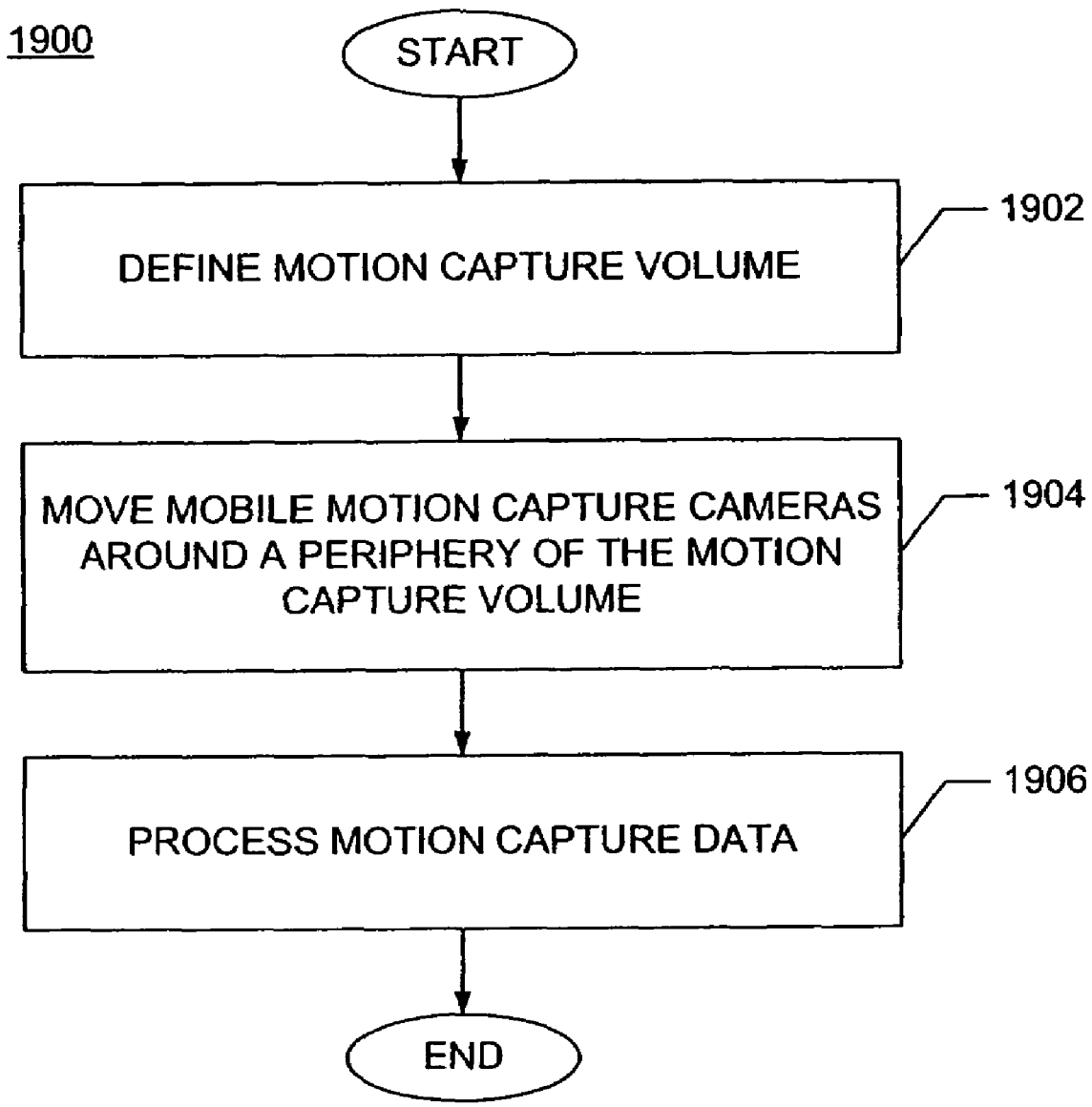
FIG. 19 illustrates one implementation of a method for capturing motion.

FIG. 19 illustrates one implementation of a method 1900 for capturing motion using mobile cameras. Initially, a motion capture volume configured to include at least one moving object is defined, at box 1902. The moving object has markers defining a plurality of points on the moving object. The volume can be an open space defined by use guidelines (e.g., actors and cameras are to stay within 10 meters of a given location) or a restricted space defined by barriers (e.g., walls) or markers (e.g., tape on a floor). In another implementation, the volume is defined by the area that can be captured by the motion capture cameras (e.g., the volume moves with the mobile motion capture cameras). Then, at box 1904, at least one mobile motion capture camera is moved around a periphery of the motion capture volume such that substantially all laterally exposed surfaces of the moving object while in motion within the motion capture volume are within a field of view of the mobile motion capture cameras at substantially all times. In another implementation, one or more mobile motion capture cameras move within the volume, rather than only the perimeter (instead of, or in addition to, one or more cameras moving around the periphery). Finally, data from the motion capture cameras is processed, at box 1906, to produce a digital representation of movement of the moving object.

Figure 6:
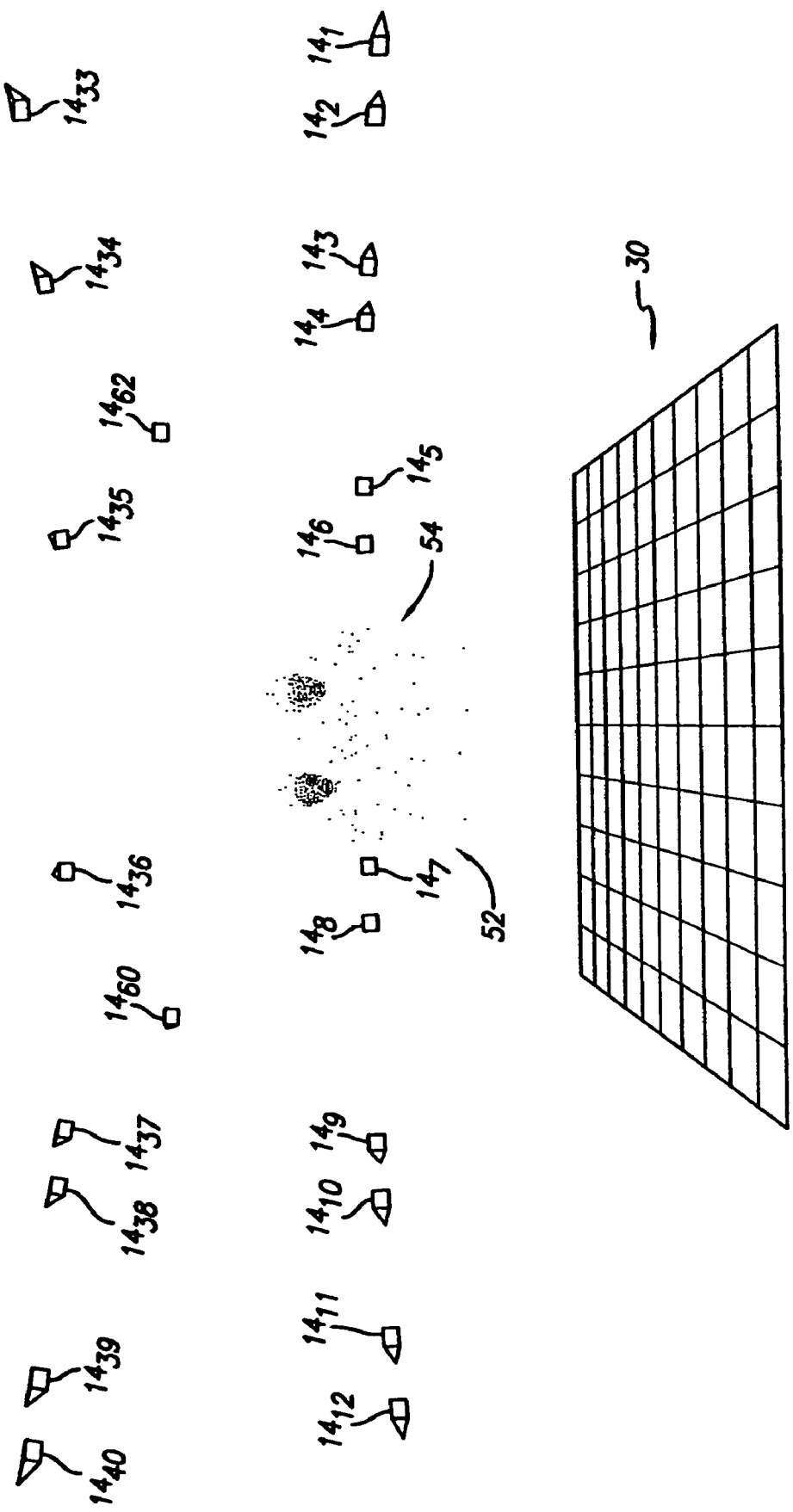
FIG. 6 is a perspective view of the motion capture volume illustrating a motion capture data reflecting two actors in the motion capture volume.

FIG. 6 is a perspective view of the motion capture volume 30 illustrating motion capture data reflecting two actors 52, 54 within the motion capture volume. The view of FIG. 6 reflects how the motion capture data would be viewed by an operator of a workstation 18 as described above with respect to FIG. 1. Similar to FIGS. 2 and 3 (above), FIG. 6 further illustrates a plurality of facial motion cameras, including cameras $14_1$-$14_{12}$ located in a lower tier, cameras $14_{33}$-$14_{40}$ located in an upper tier, and cameras $14_{60}$, $14_{62}$ located in the corners of motion capture volume 30. The two actors 52, 54 appear as a cloud of dots corresponding to the reflective markers on their body and face. As shown and discussed above, there are a much higher number of markers located on the actors' faces than on their bodies. The movement of the actors' bodies and faces is tracked by the motion capture system 10, as substantially described above.

Figure 7:
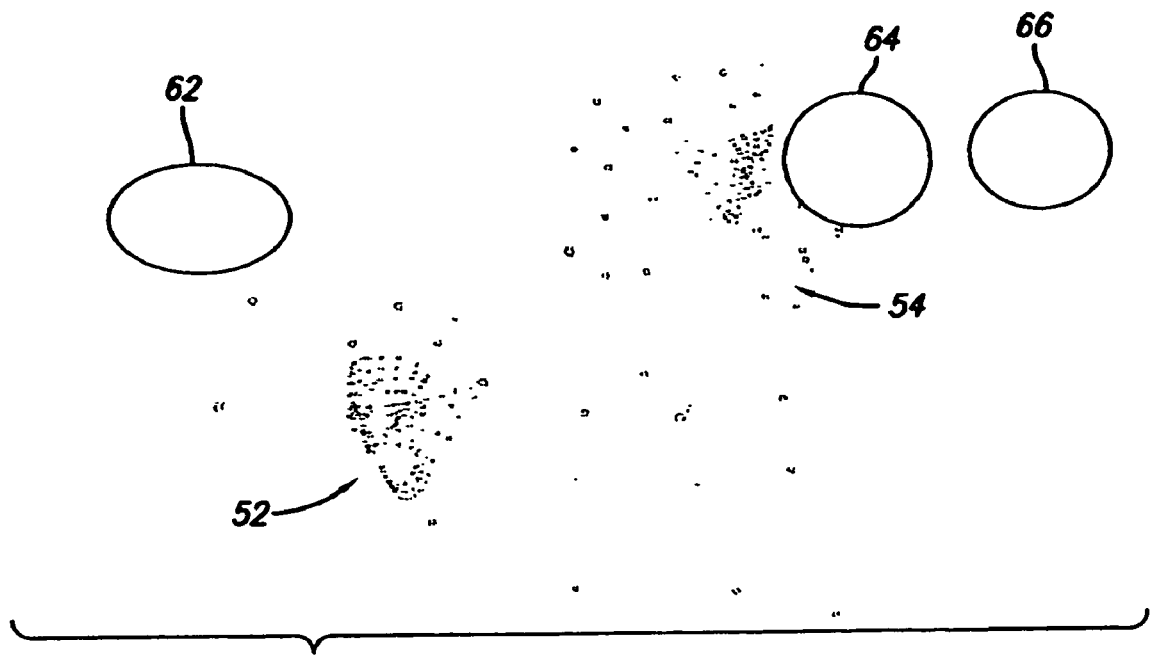
FIG. 7 illustrates motion capture data reflecting two actors in the motion capture volume and showing occlusions regions of the data.
Figure 8:
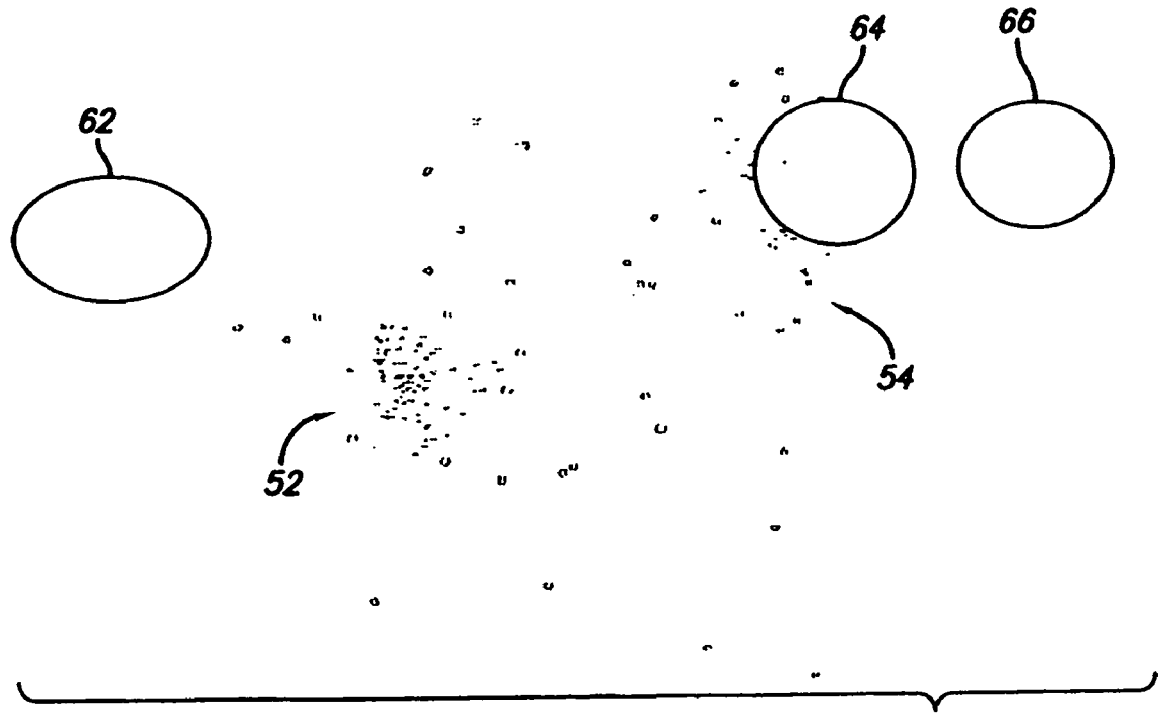
FIG. 8 illustrates motion capture data as in FIG. 7, in which one of the two actors has been obscured by an occlusion region.

Referring now to FIGS. 7 and 8, motion capture data is shown as it would be viewed by an operator of a workstation 18. As in FIG. 6, the motion capture data reflects two actors 52, 54 in which the high concentration of dots reflects the actors' faces and the other dots reflect body points. The motion capture data further includes three occlusion regions 62, 64, 66 illustrated as oval shapes. The occlusion regions 62, 64, 66 represent places in which reliable motion data was not captured due to light from one of the cameras falling within the fields of view of other cameras. This light overwhelms the illumination from the reflective markers, and is interpreted by motion capture processor 12 as a body or facial marker. The image processing process executed by the motion capture processor 12 generates a virtual mask that filters out the camera illumination by defining the occlusion regions 62, 64, 66 illustrated in FIGS. 7 and 8. The production company can attempt to control the performance of the actors to physically avoid movement that is obscured by the occlusion regions. Nevertheless, some loss of data capture inevitably occurs, as shown in FIG. 8 in which the face of actor 54 has been almost completely obscured by physical movement into the occlusion region 64.

Figure 9:
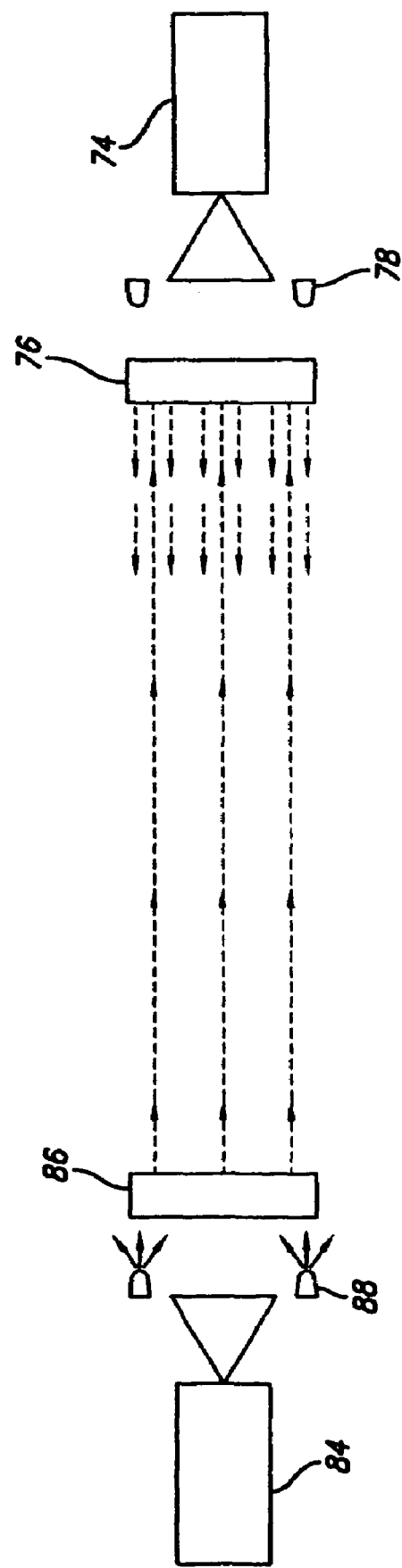
FIG. 9 is a block diagram illustrating an alternative embodiment of the motion capture cameras utilized in the motion capture system.

FIG. 9 illustrates an embodiment of the motion capture system that reduces the occlusion problem. Particularly, FIG. 9 illustrates cameras 84 and 74 that are physically disposed opposite one another across the motion capture volume (not shown). The cameras 84, 74 include respective light sources 88, 78 adapted to illuminate the fields of view of the cameras. The cameras 84, 74 are further provided with polarized filters 86, 76 disposed in front of the camera lenses. As will be clear from the following description, the polarized filters 86, 76 are arranged (i.e., rotated) out of phase with respect to each other. Light source 88 emits light that is polarized by polarized filter 86. The polarized light reaches polarized filter 76 of camera 74, but, rather than passing through to camera 74, the polarized light is reflected off of or absorbed by polarized filter 76. As a result, the camera 84 will not "see" the illumination from camera 74, thereby avoiding formation of an occlusion region and obviating the need for virtual masking.

While the preceding description referred to the use of optical sensing of physical markers affixed to the body and face to track motion, it should be appreciated to those skilled in the art that alternative ways to track motion can also be advantageously utilized. For example, instead of affixing markers, physical features of the actors (e.g., shapes of nose or eyes) can be used as natural markers to track motion. Such a feature-based motion capture system would eliminate the task of affixing markers to the actors prior to each performance. In addition, alternative media other than optical can be used to detect corresponding markers. For example, the markers can comprise ultrasonic or electromagnetic emitters that are detected by corresponding receivers arranged around the motion capture volume. In this regard, it should be appreciated that the cameras described above are merely optical sensors and that other types of sensors can also be advantageously utilized.

Figure 10:
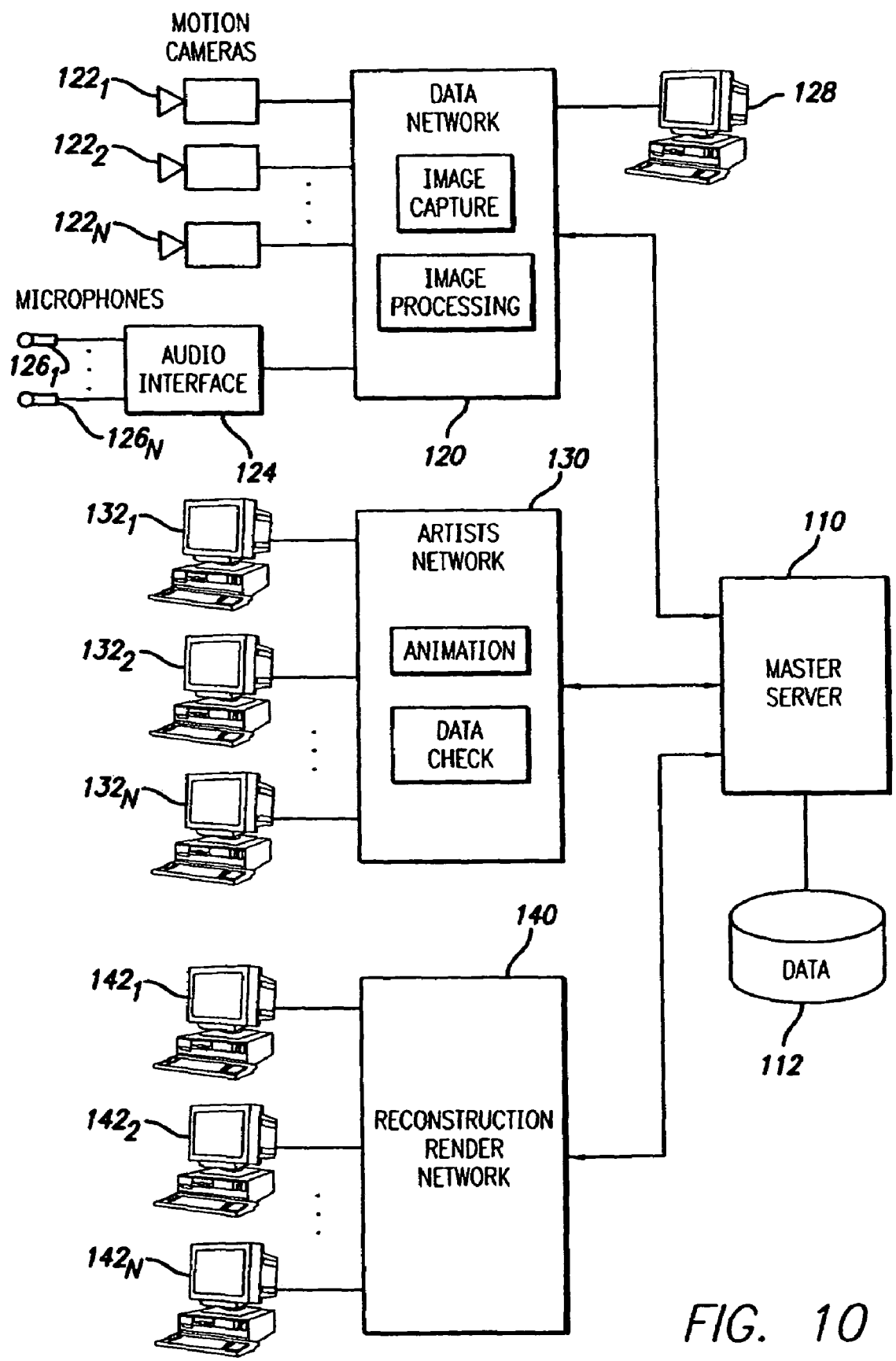
FIG. 10 is a block diagram illustrating a motion capture system in accordance with another embodiment of the present invention.

Referring now to FIG. 10, a block diagram illustrates a motion capture system 100 in accordance with an alternative embodiment of the present invention. The motion capture system 100 has substantially increased data capacity over the preceding embodiment described above, and is suitable to capture a substantially larger amount of data associated with an enlarged motion capture volume. The motion capture system 100 includes three separate networks tied together by a master server 110 that acts as a repository for collected data. The networks include a data network 120, an artists network 130, and a reconstruction render network 140. The master server 110 provides central control and data storage for the motion capture system 100. The data network 120 communicates the two-dimensional (2D) data captured during a performance to the master server 110. The artists network 130 and reconstruction render network 140 may subsequently access these same 2D data files from the master server 110. The master server 110 may further include a memory 112 system suitable for storing large volumes of data.

The data network 120 provides an interface with the motion capture cameras and provides initial data processing of the captured motion data, which is then provided to the master server 110 for storage in memory 112. More particularly, the data network 120 is coupled to a plurality of motion capture cameras $122_1$-$122_N$ that are arranged with respect to a motion capture volume (described below) to capture the combined motion of one or more actors performing within the motion capture volume. The data network 120 may also be coupled to a plurality of microphones $126_1$-$126_N$ either directly or through a suitable audio interface 124 to capture audio associated with the performance (e.g., dialog). One of more user workstations 128 may be coupled to the data network 120 to provide operation, control and monitoring of the function of the data network. In an embodiment of the invention, the data network 120 may be provided by a plurality of motion capture data processing stations, such as available from Vicon Motion Systems or Motion Analysis Corp, along with a plurality of slave processing stations for collating captured data into 2D files.

The artists network 130 provides a high speed infrastructure for a plurality of data checkers and animators using suitable workstations $132_1$-$132_N$. The data checkers access the 2D data files from the master server 110 to verify the acceptability of the data. For example, the data checkers may review the data to verify that critical aspects of the performance were captured. If important aspects of the performance were not captured, such as if a portion of the data was occluded, the performance can be repeated As necessary until the captured data is deemed acceptable. The data checkers and associated workstations $132_1$-$132_N$ may be located in close physical proximity to the motion capture volume in order to facilitate communication with the actors and/or scene director.

The reconstruction render network 140 provides high speed data processing computers suitable for performing automated reconstruction of the 2D data files and rendering the 2D data files into three-dimensional (3D) animation files that are stored by the master server 110. One of more user workstations $142_1$-$142_N$ may be coupled to the reconstruction render network 140 to provide operation, control and monitoring of the function of the data network. The animators accessing the artists network 130 will also access the 3D animation files in the course of producing the final computer graphics animation.

Similar to the description above for fixed motion capture cameras, motion (e.g., video) captured by the mobile cameras of the motion capture rig is provided to a motion capture processing system, such as the data network 120 (see FIG. 10). Moreover, the motion capture processing system uses the captured motion to determine the location and movement of markers on a target (or targets) in front of the motion capture cameras. The processing system uses the location information to build and update a three dimensional model (a point cloud) representing the target(s). In a system using multiple motion capture rigs or a combination of one or more motion capture rigs and one or more fixed cameras, the processing system combines the motion capture information from the various sources to produce the model.

In one implementation, the processing system determines the location of the motion capture rig and the location of the cameras in the rig by correlating the motion capture information for those cameras with information captured by other motion capture cameras (e.g., reference cameras as part of calibration). The processing system can automatically and dynamically calibrate the motion capture cameras as the motion capture rig moves. The calibration may be based on other motion capture information, such as from other rigs or from fixed cameras, determining how the motion capture rig information correlates with the rest of the motion capture model.

In another implementation, the processing system calibrates the cameras using motion capture information representing the location of fixed tracking markers or dots attached to known fixed locations in the background. Thus, the processing system ignores markers or dots on moving targets for the purpose of calibration.

Figure 11:
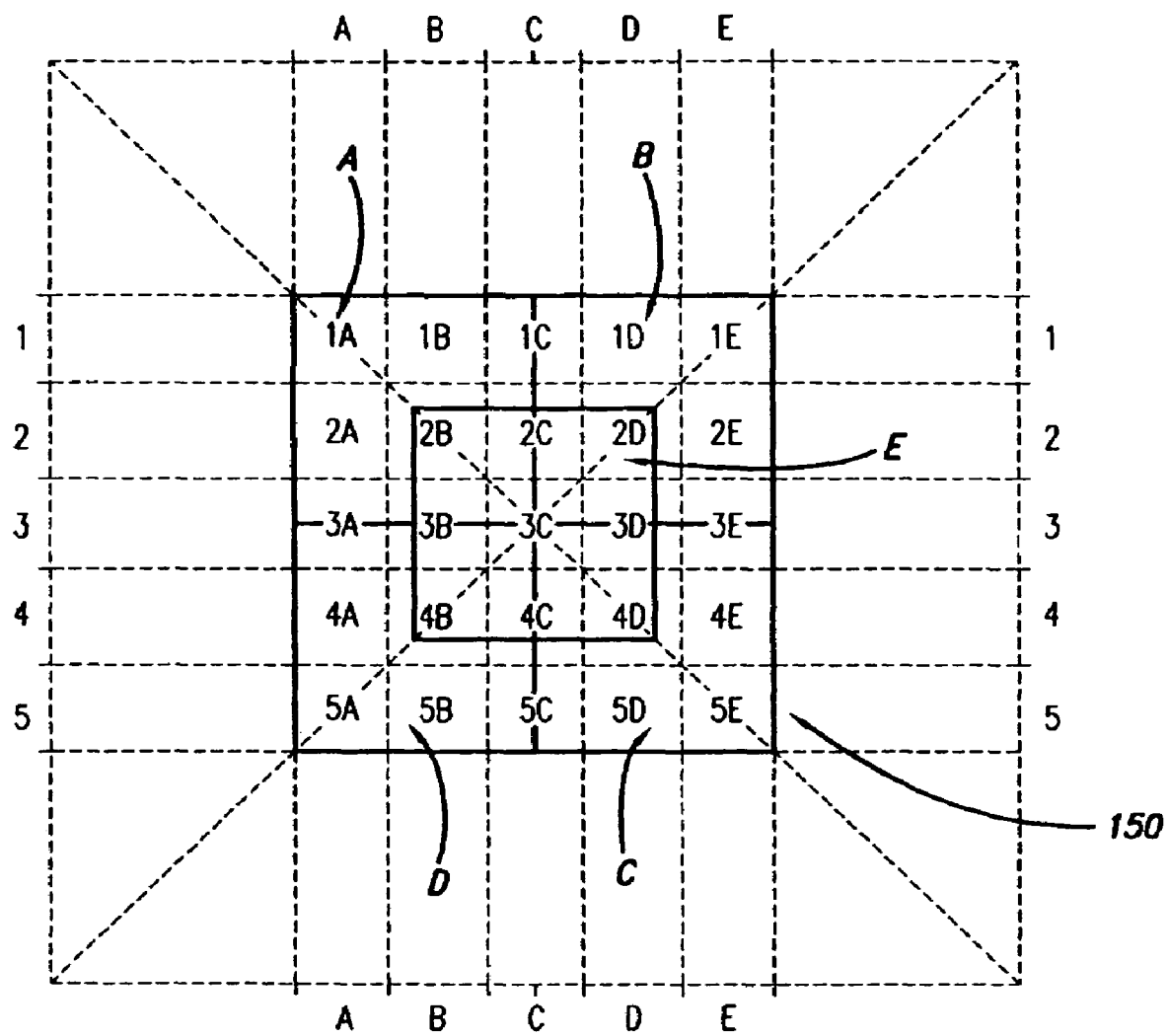
FIG. 11 is a top view of an enlarged motion capture volume defining a plurality of performance regions.

FIG. 11 illustrates a top view of another motion capture volume 150. As in the foregoing embodiment, the motion capture volume 150 is a generally rectangular shaped region subdivided by gridlines. In this embodiment, the motion capture volume 150 is intended to represent a significantly larger space, and can be further subdivided into four sections or quadrants (A, B, C, D). Each section has a size roughly equal to that of the motion capture volume 30 described above, so this motion capture volume 150 has four times the surface area of the preceding embodiment. An additional section E is centered within the space and overlaps partially with each of the other sections. The gridlines further include numerical coordinates (1-5) along the vertical axes and alphabetic coordinates (A-E) along the horizontal axes. This way, a particular location on the motion capture volume can be defined by its alphanumeric coordinates, such as region 4A. Such designation permits management of the motion capture volume 150 in terms of providing direction to the actors as to where to conduct their performance and/or where to place props. The gridlines and alphanumeric coordinates may be physically marked onto the floor of the motion capture volume 150 for the convenience of the actors and/or scene director. It should be appreciated that these gridlines and alphanumeric coordinates would not be included in the 2D data files.

In a preferred embodiment of the invention, each of the sections A-E has a square shape having dimensions of 10 ft by 10 ft, for a total area of 400 sq ft, i.e., roughly four times larger than the motion capture volume of the preceding embodiment. It should be appreciated that other shapes and sizes for the motion capture volume 150 can also be advantageously utilized.

Figure 12A:
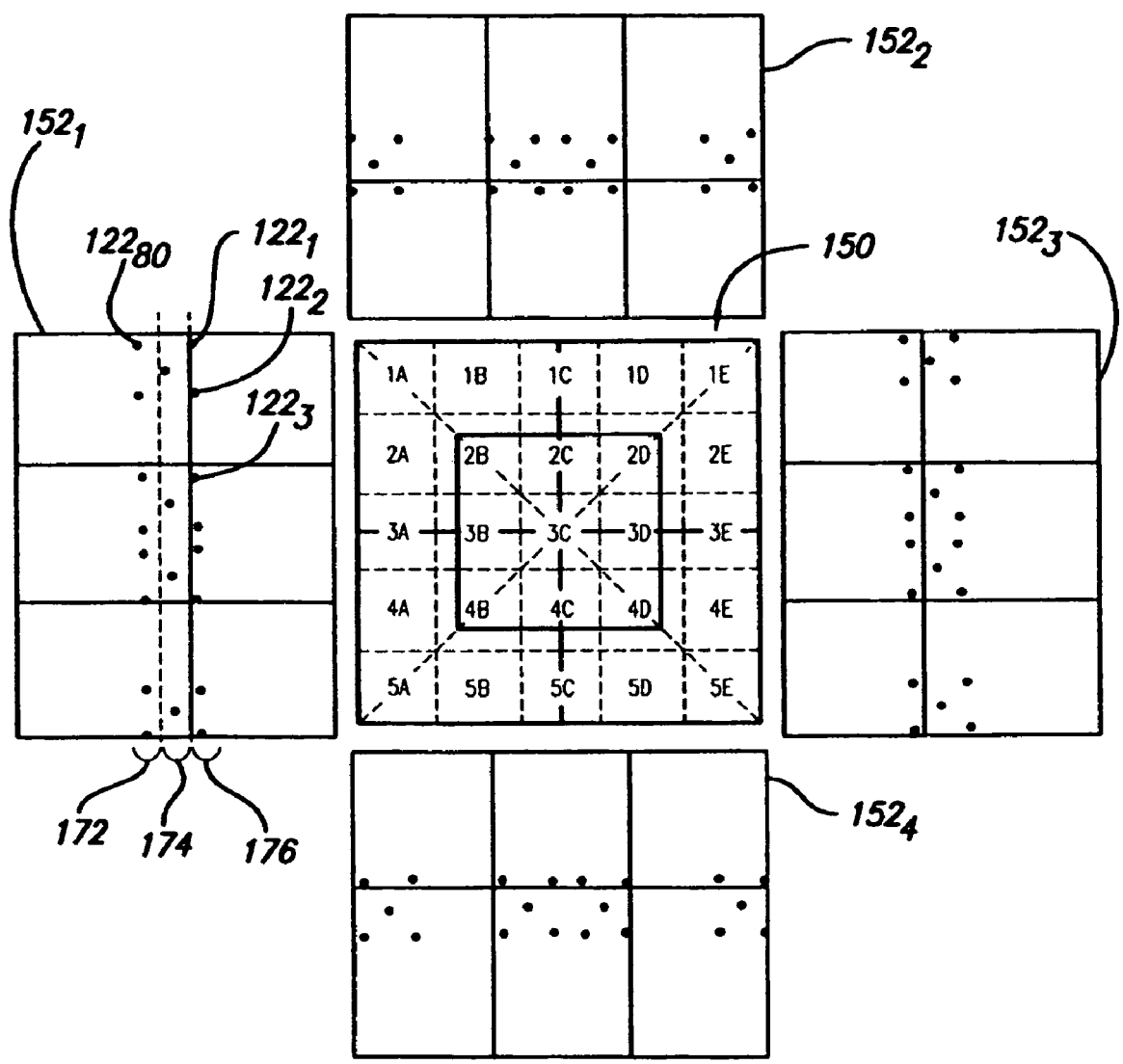
FIGS. 12A-12C are top views of the enlarged motion capture volume of FIG. 11 illustrating another arrangement of motion capture cameras.
Figure 12B:
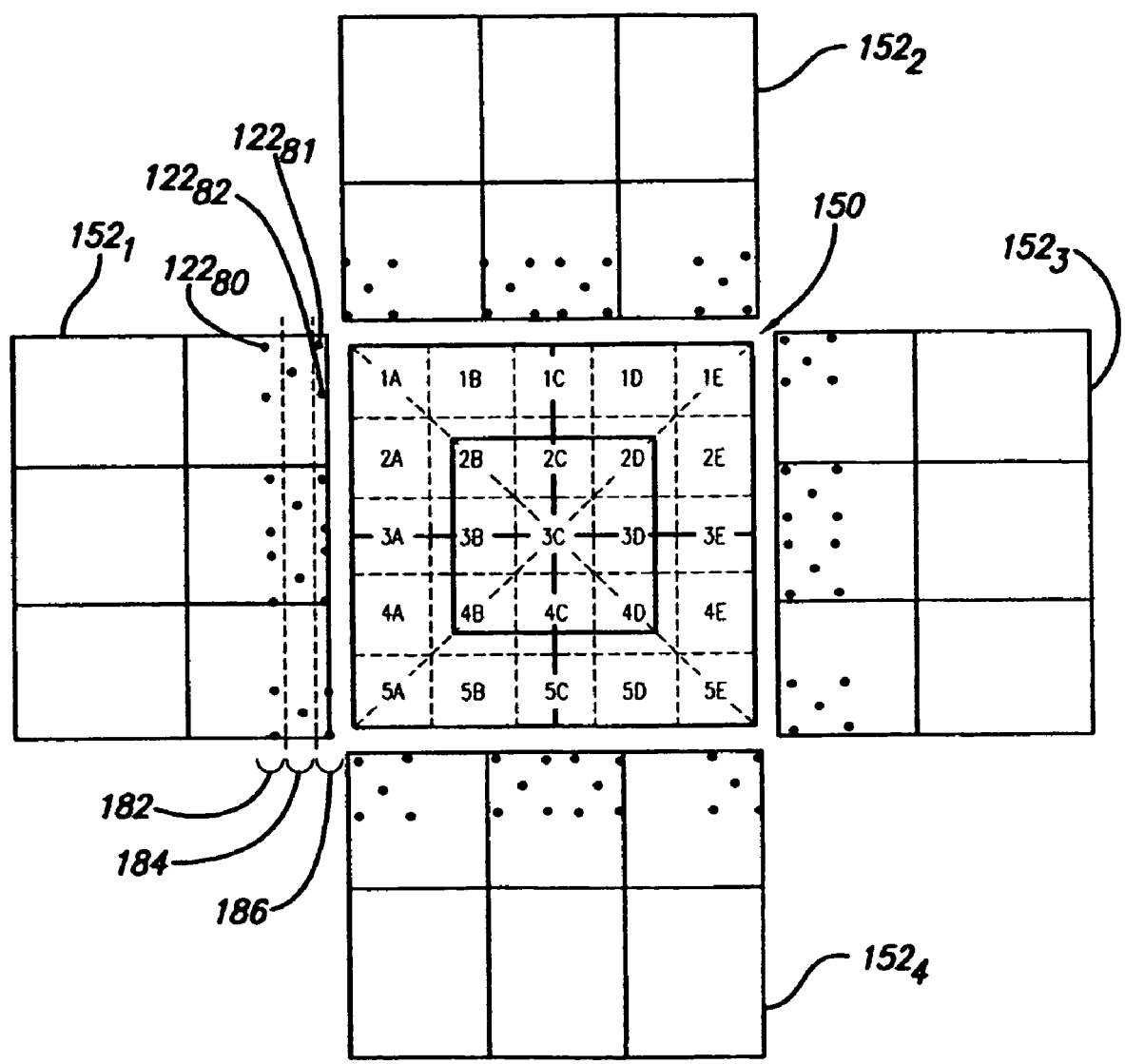
Figure 12C:
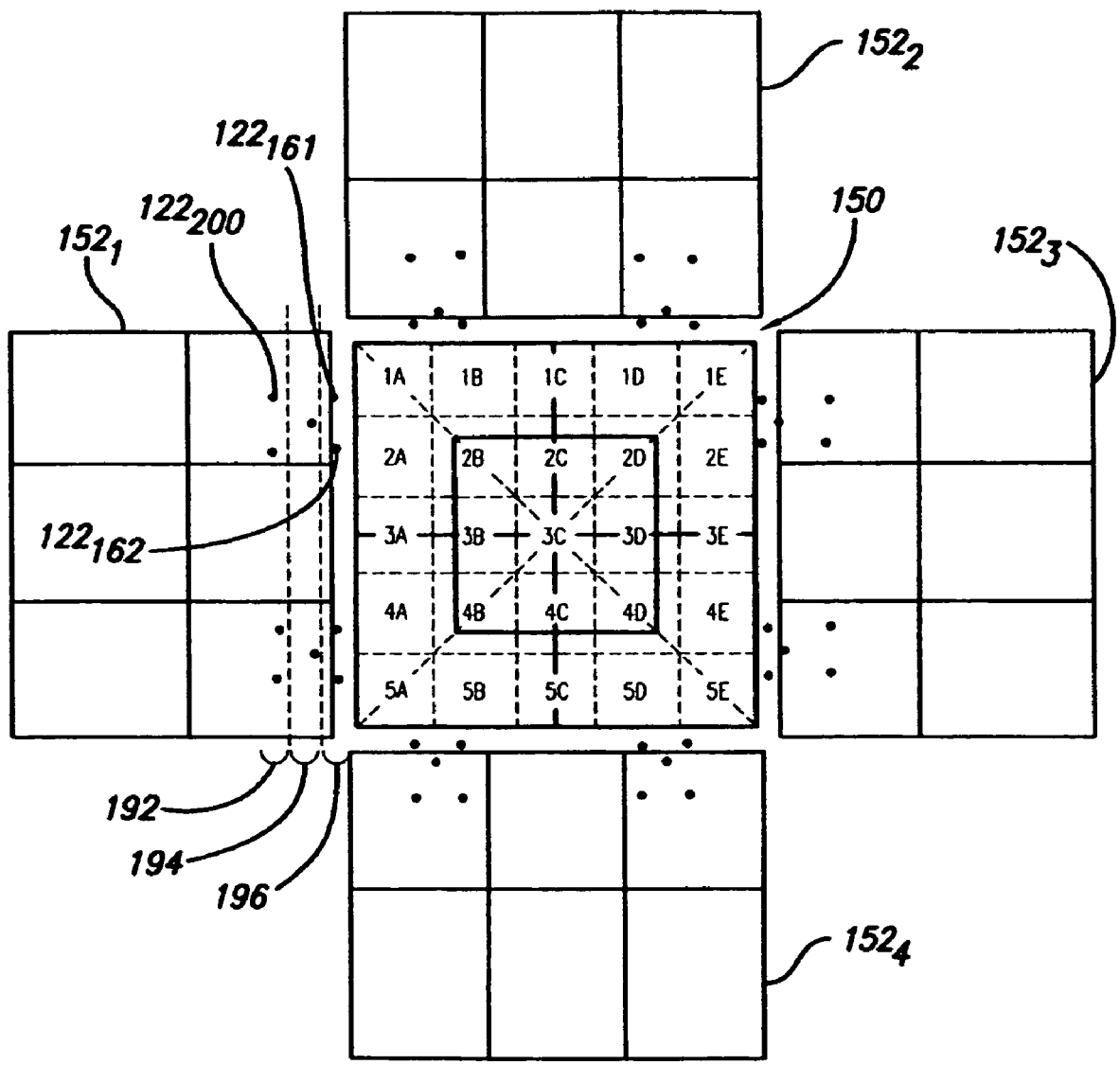

Referring now to FIGS. 12A-12C, an arrangement of motion capture cameras $122_1$-$122_N$ is illustrated with respect to a peripheral region around the motion capture volume 150. The peripheral region provides for the placement of scaffolding to support cameras, lighting, and other equipment, and is illustrated as regions $152_1$-$152_4$. The motion capture cameras $122_1$-$122_N$ are located generally evenly in each of the regions $152_1$-$152_4$ surrounding the motion capture volume 150 with a diversity, of camera heights and angles. Moreover, the motion capture cameras $122_1$-$122_N$ are each oriented to focus on individual ones of the sections of the motion capture volume 150, rather than on the entire motion capture volume. In embodiment of the invention, there are two-hundred total motion capture cameras with groups of forty individual cameras devoted to each one of the five sections A-E of the motion capture volume 150.

More specifically, the arrangement of motion capture cameras $122_1$-$122_N$ may be defined by distance from the motion capture volume and height off the floor of the motion capture volume 150. FIG. 12A illustrates an arrangement of a first group of motion capture cameras $122_1$-$122_N$ that are oriented the greatest distance from the motion capture volume 150 and at the generally lowest height. Referring to region 152, (of which the other regions are substantially identical), there are three rows of cameras with a first row 172 disposed radially outward with respect to the motion capture volume 150 at the highest height from the floor (e.g., 6 ft), a second row 174 at a slightly lower height (e.g., 4 ft), and a third row 176 disposed radially inward with respect to the first and second rows and at a lowest height (e.g., 1 ft). In the embodiment, there are eighty total motion capture cameras in this first group.

FIG. 12B illustrates an arrangement of a second group of motion capture cameras $122_{81}$-$122_{160}$ that are oriented closer to the motion capture volume 150 than the first group and at a height greater than that of the first group. Referring to region $152_1$ (of which the other regions are substantially identical), there are three rows of cameras with a first row 182 disposed radially outward with respect to the motion capture volume at the highest height from the floor (e.g., 14 ft), a second row 184 at a slightly lower height (e.g., 11 ft), and a third row 186 disposed radially inward with respect to the first and second rows and at a lowest height (e.g., 9 ft). In the embodiment, there are eighty total motion capture cameras in this second group.

FIG. 12C illustrates an arrangement of a third group of motion capture cameras $122_{161}$-$122_{200}$ that are oriented closer to the motion capture volume 150 than the second group and at a height greater than that of the second group. Referring to region $152_1$ (of which the other regions are substantially identical), there are three rows of cameras with a first row 192 disposed radially outward with respect to the motion capture volume at the highest height from the floor (e.g., 21 ft), a second row 194 at a slightly lower height (e.g., 18 ft), and a third row 196 disposed radially inward with respect to the first and second rows at a lower height (e.g., 17 ft). In the embodiment, there are forty total motion capture cameras in this second group. It should be appreciated that other arrangements of motion capture cameras and different numbers of motion capture cameras can also be advantageously utilized.

The motion capture cameras are focused onto respective sections of the motion capture volume 150 in a similar manner as described above with respect to FIG. 4. For each of the sections A-E of the motion capture volume 150, motion capture cameras from each of the four sides will be focused onto the section. By way of example, the cameras from the first group most distant from the motion capture volume may focus on the sections of the motion capture volume closest thereto. Conversely, the cameras from the third group most close to the motion capture volume may focus on the sections of the motion capture volume farthest therefrom. Cameras from one end of one of the sides may focus on sections at the other end. In a more specific example, section A of the motion capture volume 150 may be covered by a combination of certain low height cameras from the first row 182 and third row 186 of peripheral region $152_1$, low height cameras from the first row 182 and third row 186 of peripheral region $152_4$, medium height cameras from the second row 184 and third row 186 of peripheral region $152_3$, medium height cameras from the second row 184 and third row 186 of peripheral region $152_2$. FIGS. 12A and 12B further reveal a greater concentration of motion cameras in the center of the peripheral regions for capture of motion within the center section E.

By providing a diversity of angles and heights, with many cameras focusing on the sections of the motion capture volume 150, there is far greater likelihood of capturing the entire performance while minimizing incidents of undesirable occlusions. In view of the large number of cameras used in this arrangement, it may be advantageous to place light shields around each of the camera to cut down on detection of extraneous light from another camera located opposite the motion capture volume. In this embodiment of the invention, the same cameras are used to capture both facial and body motion at the same time, so there is no need for separate body and facial motion cameras. Different sized markers may be utilized on the actors in order to distinguish between facial and body motion, with generally larger markers used overall in order to ensure data capture given the larger motion capture volume. For example, 9 millimeter markers may be used for the body and 6 millimeter markers used for the face.

Various implementations of the invention are realized in electronic hardware, computer software, or combinations of these technologies. One implementation includes one or more programmable processors and corresponding computer system components to store and execute computer instructions, such as to provide the motion capture processing of the video captured by the mobile motion capture cameras and to calibrate those cameras during motion. Other implementations include one or more computer programs executed by a programmable processor or computer. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, in one variation, a combination of motion capture rigs with different numbers of cameras can be used to capture motion of targets before the cameras. Different numbers of fixed and mobile cameras can achieve desired results and accuracy, for example, 50% fixed cameras and 50% mobile cameras; 90% fixed cameras and 10% mobile cameras; or 100% mobile cameras. Therefore, the configuration of the cameras (e.g., number, position, fixed vs. mobile, etc.) can be selected to match the desired result.

Accordingly, the present invention is not limited to only those implementations described above.

What is claimed is:

1. A system for capturing motion, comprising:
    a motion capture volume configured to include at least one moving object having markers defining a plurality of points on said at least one moving object;
    at least one mobile motion capture camera, said at least one mobile motion capture camera configured to be moveable within said motion capture volume;
    a motion capture processor coupled to said at least one mobile motion capture camera to produce a digital representation of movement of said at least one moving object; and
    a camera motion processor coupled to said at least one mobile motion capture camera to track the movement of said at least mobile motion capture camera and to remove the movement in the subsequent processing of captured data to generate said digital representation of movement of said at least one moving object.

2. The system for capturing motion of claim 1, further comprising at least one fixed motion capture camera.

3. The system for capturing motion of claim 1, wherein said at least one mobile motion capture camera moves around the periphery of the volume.

4. The system for capturing motion of claim 1, wherein said at least one mobile motion capture camera is moved such that substantially all laterally exposed surfaces of said at least one moving object while in motion within said motion capture volume are within a field of view of said at least one mobile motion capture camera at substantially all times.

5. The system for capturing motion of claim 1, wherein said at least one mobile motion capture camera is arranged to provide a larger effective volume of said motion capture volume than possible with all fixed motion capture cameras.

6. The system of capturing motion of claim 1, wherein said at least one mobile motion capture camera is moved from a first position to a second position and is fixed at said second position.

7. The system for capturing motion of claim 1, wherein said at least one mobile motion capture camera is moved to follow the action of said at least one moving object and to perform motion capture while moving.

8. The system for capturing motion of claim 1, further comprising at least one servomotor used to move said at least one mobile motion capture camera.

9. The system for capturing motion of claim 1, wherein said at least one mobile motion capture camera is moved individually.

10. The system for capturing motion of claim 1, wherein said at least one mobile motion capture camera includes
a first reference camera configured to show views of said at least one mobile motion capture camera.

11. The system for capturing motion of claim 1, wherein said at least one mobile motion capture camera includes
a second reference camera configured to generate reference and adjustment of action captured by said at least one mobile motion capture camera.

12. The system for capturing motion of claim 1, wherein said at least one mobile motion capture camera includes
a feedback loop configured to generate reference and adjustment of motion captured by said at least one mobile motion capture camera without a reference camera.

13. The system for capturing motion of claim 1, further comprising
at least one mobile motion capture rig configured to enable at least one of said at least one mobile motion capture camera to be disposed on said at least one mobile motion capture rig such that cameras of said at least one mobile motion capture camera are moved.

14. The system for capturing motion of claim 13, wherein at least one of said at least one mobile motion capture rig includes
at least one servomotor configured to provide translation and rotational movements to said at least one mobile motion capture camera disposed on that mobile motion capture rig.

15. The system for capturing motion of claim 14, wherein said at least one servomotor is coupled to said at least one mobile motion capture rig to provide said translation and rotational movements together to said at least one mobile motion capture camera.

16. The system for capturing motion of claim 14, wherein said at least one servomotor is coupled to each of said at least one mobile motion capture camera to provide said translation and rotational movements individually to said each of said at least one mobile motion capture camera.

17. The system for capturing motion of claim 16, wherein at least one of said at least one mobile motion capture camera is restricted in at least one movement of said translation and rotational movements.

18. The system for capturing motion of claim 13, wherein said at least one mobile motion capture rig is configured such that movements of said at least one mobile motion capture rig are pre-programmed.

19. The system for capturing motion of claim 13, wherein said at least one mobile motion capture rig is configured to move automatically based on received input for said at least one moving object.

20. The system for capturing motion of claim 19, wherein said received input includes a visual signal received from said at least one moving object.

21. The system for capturing motion of claim 20, wherein said at least one mobile motion capture rig moves with said at least one moving object on captured movement of that object.

22. The system for capturing motion of claim 1, further comprising fixed tracking markers disposed at fixed locations within said motion capture volume.

23. The system for capturing motion of claim 22, further comprising
a camera calibration system to calibrate said at least one mobile motion capture camera using motion capture information representing the location of said fixed tracking markers.

24. A system for capturing motion, comprising:
at least one mobile motion capture camera configured to be moveable, said at least one mobile motion capture camera operating to capture data representing at least one motion within a motion capture volume;
at least one mobile motion capture rig configured to enable said at least one mobile motion capture camera to be disposed on said at least one mobile motion capture rig such that cameras of said at least one mobile motion capture camera can be moved; and
a camera motion processor coupled to said at least one mobile motion capture camera to track the movement of said at least one mobile motion capture camera and to remove the movement in subsequent processing of said captured data to generate a digital representation of said at least one motion.

25. A method for capturing motion, comprising:
defining a motion capture volume configured to include at least one moving object having markers defining a plurality of points on said at least one moving object;
moving at least one mobile motion capture camera within said motion capture volume;
tracking the movement of said at least one mobile motion capture camera; and
processing data from said at least one mobile motion capture camera to produce a digital representation of movement of said at least one moving object, said processing data including removing said movement of said at least one mobile motion capture camera.

26. The method of claim 25, wherein said moving said at least one mobile motion capture camera includes
moving said at least one mobile motion capture camera from a first position to a second position and is fixed at said second position.

27. The method of claim 25, wherein said moving said at least one mobile motion capture camera includes
moving said at least one mobile motion capture camera to follow the action of said at least one moving object and to perform motion capture while moving.

28. The method of claim 25, wherein said at least one mobile motion capture camera includes
generating reference and adjustment of motion captured by said at least one mobile motion capture camera.

29. The method of claim 25, further comprising
placing fixed tracking markers at fixed locations within said motion capture volume.

30. The method of claim 29, further comprising
calibrating said at least one mobile motion capture camera using motion capture information representing the location of said fixed tracking markers.

31. A system for capturing motion, comprising:
means for defining a motion capture volume configured to include at least one moving object having markers defining a plurality of points on said at least one moving object;

means for moving at least one mobile motion capture camera within said motion capture volume;

means for tracking the movement of said at least one mobile motion capture camera; and means for processing data from said at least one mobile motion capture camera to produce a digital representation of movement of said at least one moving object, said means for processing data including means for removing said movement of said at least one mobile motion capture camera.

* * * * *

UNITED STATES PATENT AND TRADEMARK OFFICE
CERTIFICATE OF CORRECTION

PATENT NO. : 7,333,113 B2 Page 1 of 1
APPLICATION NO. : 11/372330
DATED : February 19, 2008
INVENTOR(S) : Demian Gordon It is certified that error appears in the above-identified patent and that said Letters Patent is hereby corrected as shown below:

Column 16, line 55, delete "said at least mobile motion capture camera" and insert --said at least one mobile motion capture camera--.

Signed and Sealed this

Seventeenth Day of June, 2008

JON W. DUDAS
*Director of the United States Patent and Trademark Office*